(12) United States Patent
Hasegawa et al.

(10) Patent No.: US 11,306,607 B2
(45) Date of Patent: Apr. 19, 2022

(54) STEAM VALVE, AND POWER GENERATION SYSTEM

(71) Applicant: MITSUBISHI HEAVY INDUSTRIES, LTD., Tokyo (JP)

(72) Inventors: Noriyuki Hasegawa, Tokyo (JP); Kensuke Futahashi, Tokyo (JP); Megumu Tsuruta, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 223 days.

(21) Appl. No.: 16/697,367

(22) Filed: Nov. 27, 2019

(65) Prior Publication Data

US 2020/0208534 A1    Jul. 2, 2020

(30) Foreign Application Priority Data

Dec. 28, 2018    (JP) .............................. JP2018-246471

(51) Int. Cl.
*F01D 17/14*    (2006.01)
*F01D 17/18*    (2006.01)
(Continued)

(52) U.S. Cl.
CPC ........... *F01D 17/145* (2013.01); *F01D 17/18* (2013.01); *F01K 13/02* (2013.01);
(Continued)

(58) Field of Classification Search
CPC ........ F01D 17/145; F01D 17/18; F01D 17/02; F01D 21/14; F01D 17/14; F05D 2220/31;
(Continued)

(56) References Cited

U.S. PATENT DOCUMENTS 4,461,152 A * 7/1984 Tennichi ................. F01D 17/24
60/660
4,617,955 A * 10/1986 Melgaard ................ F16K 1/446
137/240
(Continued)

FOREIGN PATENT DOCUMENTS

CA          1313173         1/1993
CN        104358910         2/2015
(Continued)

*Primary Examiner* — Hoang M Nguyen
(74) *Attorney, Agent, or Firm* — Wenderoth, Lind & Ponack, L.L.P.

(57) ABSTRACT

A steam valve has a tubular stop valve configured to move toward an upper/lower end side along a direction of an axis when the stop valve is opened/closed; and a valve main body accommodating the stop valve, wherein a base end portion including an end portion of the stop valve at the upper end side is accommodated in a first accommodation space formed in the valve main body, the base end portion has a plurality of inclination surfaces formed on an outer circumference of the base end portion which are inclined such that a distance from the axis to each of the plurality of inclination surfaces decreases toward the upper end side, and a plurality of contact surfaces are formed in the first accommodation space to come in contact with the plurality of inclination surfaces respectively when the stop valve moves toward the upper end side.

14 Claims, 15 Drawing Sheets

(51) Int. Cl.
*F16K 1/44* (2006.01)
*F16K 47/08* (2006.01)
*F01K 13/02* (2006.01)

(52) U.S. Cl.
CPC .......... *F05D 2220/31* (2013.01); *F16K 1/443* (2013.01); *F16K 47/08* (2013.01)

(58) Field of Classification Search
CPC ...... F05D 2250/41; F16K 1/443; F16K 47/08; F16K 1/00; F16K 1/38; F16K 37/0083; F16K 1/52; F16K 27/0254; F01K 13/02; F01K 7/08; F01K 7/06; F01K 11/02
See application file for complete search history.

(56) References Cited

U.S. PATENT DOCUMENTS 5,295,783 A * 3/1994 Lesko ..................... F01D 17/06
415/30
10,087,773 B2 * 10/2018 Kahl ....................... F01D 17/10
2016/0169030 A1 6/2016 Kahl et al.
2016/0356398 A1 12/2016 Saito et al.
2018/0340627 A1 11/2018 Futahashi et al.
2019/0178388 A1 6/2019 Hata et al.

FOREIGN PATENT DOCUMENTS

| | | |
|---|---|---|
| CN | 204985775 | 1/2016 |
| CN | 206072475 | 4/2017 |
| CN | 106641383 | 5/2017 |
| CN | 206513847 | 9/2017 |
| CN | 108350749 | 7/2018 |
| CN | 109073094 | 12/2018 |
| EP | 0133797 | 3/1985 |
| JP | 08-193502 | 7/1996 |
| JP | 2016-534289 | 11/2016 |
| JP | 6162335 | 7/2017 |
| KR | 10-2000-0027414 | 5/2000 |

* cited by examiner

STEAM VALVE, AND POWER GENERATION SYSTEM

TECHNICAL FIELD

The present invention relates to a steam valve and a power generation system.

Priority is claimed on Japanese Patent Application No. 2018-246471, filed on Dec. 28, 2018, the content of which is incorporated herein by reference.

BACKGROUND ART

A power generation system includes a steam turbine and a steam valve configured to adjust steam quantity according to load change and cut off supply of the steam when an abnormality occurs.

A steam valve having a regulation valve, a stop valve, and a valve main body accommodating the stop valve and the regulation valve is disclosed in Patent Document 1.

The regulation valve is configured to control the flow rate of the steam which flows into the steam turbine.

The stop valve is formed in a tubular shape so as to surround the regulation valve, and the stop valve is configured to be movable along an axial direction of the steam valve. A tip end of the stop valve comes in contact with an inner surface of a valve seat configuring the valve main body so as to cut off the steam supplied to the steam turbine.

A base end portion of the stop valve is formed in a ring shape such that an inner circumferential surface and an outer circumferential surface of the based end portion are orthogonal to a base end surface of the based end portion. The base end portion is accommodated in a ring-shaped accommodation space formed in the valve main body.

The valve main body is configured to have the inner surface of the valve seat to be exposed and the valve main body is configured to partition the steam flow passage in which the steam flows.

CITATION LIST

Patent Literature

[Patent Document 1] Japanese Patent No. 6162335

SUMMARY OF INVENTION

Technical Problem

However, the steam valve disclosed in Patent Document 1 is configured that a position of the based end portion in the accommodation space is not regulated. Accordingly, the stop valve will be abrased since the stop valve rattles with respect to the valve main body due to a force of the steam or the valve main body and the stop valve come in contact with each other due to rotation of the stop valve inside the valve main body.

The steam valve disclosed in Patent Document 1 does not include a mechanism for detecting an open/close state of the stop valve. Accordingly, it is difficult to detect the open/close state of the stop valve.

An object of the present invention is to provide a steam valve capable of suppressing the abrasion of the stop valve, and a power generation system.

Another object of the present invention is to provide a steam valve capable of detecting the open/close state of the stop valve, and a power generation system.

Solution to Problem

In order to solve the above-identified problem, a steam valve according to an embodiment of the present invention has a tubular stop valve and a valve main body configured to accommodate the stop valve, the stop valve being configured to move toward an upper end side along a direction of an axis when the stop valve is opened, and move toward a lower end side along the direction of the axis when the stop valve is closed, wherein a base end portion including an end portion of the stop valve at the upper end side in the direction of the axis is accommodated in a first accommodation space formed in the valve main body, wherein the base end portion has a plurality of inclination surfaces formed on an outer circumference of the base end portion, the plurality of inclination surfaces being inclined such that a distance from the axis to each of the plurality of inclination surfaces decreases toward the upper end side in the direction of the axis, and wherein a plurality of contact surfaces are formed in the first accommodation space to come in contact with the plurality of inclination surfaces respectively when the stop valve moves toward the upper end side in the direction of the axis.

According to the present invention, since the plurality of inclination surfaces are inclined such that a distance from the axis to each of the plurality of inclination surfaces decreases toward the upper end side in the direction of the axis, and the plurality of contact surfaces are formed in the first accommodation space to come in contact with the plurality of inclination surfaces respectively when the stop valve moves toward the upper end side in the direction of the axis, in the state in which the plurality of contact surfaces come in contact with the plurality of inclination surfaces respectively, it is possible to regulate the position of the base end portion in the first accommodation space.

Accordingly, it is possible to suppress the rattling of the stop valve in the valve main body and the rotation of the stop valve in the valve main body so as to suppress the abrasion of the stop valve due to the rattling of the stop valve in the valve main body and the rotation of the stop valve in the valve main body.

In a steam valve according to an embodiment of the present invention, an inclination angle of each of the plurality of inclination surfaces with respect to the axis may be determined to be equal to or larger than 10 degrees and equal to or less than 60 degrees.

For example, if the inclination angle of each of the plurality of inclination surfaces with respect to the axis is smaller than 10 degrees, it is possible that a length of the first accommodation space in the direction of the axis becomes longer to lead to an enlargement of the valve main body, thus such a situation is not preferable.

On the other hand, if the inclination angle of each of the plurality of inclination surfaces with respect to the axis is larger than 60 degrees, a pressing force in the direction of the axis increases while the friction force between each of the plurality of inclination surfaces and corresponding contact surface increases. Accordingly, it is possible that in the state in which the inclination surface comes in contact with the contact surface, the stop valve is difficult to move in the direction of the axis, and such situation is not preferable.

Accordingly, by determining the inclination angle of each of the plurality of inclination surfaces with respect to the axis in the range from 10 degrees to 60 degrees, it is possible to suppress the enlargement of the valve main body and cause the stop valve to move smoothly in the direction of the axis, further to suppress the abrasion of the stop valve.

In a steam valve according to an embodiment of the present invention, the stop valve may have a first part including the based end portion, a second part including a tip end portion contacting with a valve seat of the valve main body, and an enlarged diameter portion which is disposed between the first part and the second part, the enlarged diameter portion having a ring shape and protruding outwardly in a radial direction from the outer circumferential surface of the first part and the second part, wherein the valve main body may have a second accommodation space formed to accommodate the enlarged diameter portion such that the enlarged diameter portion can be moved upwardly and downwardly in the direction of the axis, and in a state in which a movement of the valve main body toward the upper end side in the direction of the axis is finished, a first gap in the direction of the axis may be formed between the base end portion and the valve main body, and a second gap in the direction of the axis may be formed between the valve main body and a surface of the enlarged diameter portion disposed at the side of the first part.

In this manner, in the state in which the movement of the valve main body toward the upper end side in the direction of the axis is finished, the first gap in the direction of the axis is formed between the base end portion and the valve main body while the second gap in the direction of the axis is formed between the valve main body and a surface of the enlarged diameter portion disposed at the side of the first part such that it is possible to suppress the collision caused by the base end portion and the enlarged diameter portion with respect to the valve main body at the upper end side in the direction of the axis.

Accordingly, it is possible to suppress the abrasion of the base end portion and the enlarged diameter portion due to the collision by the base end portion and the enlarged diameter portion with respect to the valve main body.

In a steam valve according to an embodiment of the present invention, a detection mechanism may be configured to detect a distance between a detection surface and the stop valve.

As described above, the steam valve has the detection mechanism configured to detect the distance between the detection surface and the stop valve such that for example, an opening degree of the stop valve can be determined by figuring out a corresponding table between the distance with respect to the stop valve and the opening degree of the stop valve in advance.

In a steam valve according to an embodiment of the present invention, a detection mechanism may be configured to detect an open/close state of the stop valve.

The open/close state of the stop valve can be detected by including the detection mechanism.

In a steam valve according to an embodiment of the present invention, the detection mechanism may have a rod-shaped member configured to penetrate a part of the valve main body facing a base end surface of the base end portion and have an end coming in contact with the base end surface of the base end portion, an elastic-force-apply portion configured to apply an elastic force with respect to the rod-shaped member so as to maintain the state in which the end of the rod-shaped member comes in contact with the base end surface, and a detection portion configured to face another end of the rod-shaped member in the direction of the axis and to detect a full open state of the stop valve by coming in contact with the other end of the rod-shaped member.

In this manner, the rod-shaped member, the elastic-force-apply portion, and the detection portion described above are configured so as to detect whether the stop valve is in the full open state.

In a steam valve according to an embodiment of the present invention, the detection mechanism may include a sensor disposed in the valve main body so as to face the base end surface of the base end portion in the direction of the axis, and the sensor may be configured to determine a distance between the sensor and the base end surface in the direction of the axis.

The sensor having the above-described configuration is provided to determine the distance in the direction of the axis between the base end surface of the stop valve moving along the direction of the axis and the sensor fixed in the valve main body so as to be able to estimate the open/close state of the stop valve.

In order to solve the above-identified problem, a power generation system according to an embodiment of the present invention has the steam valve, a boiler configured to generate steam, a steam turbine driven by the steam, and a steam supply piping configured to connect the boiler and the steam turbine to supply the steam to the steam turbine, wherein the steam valve is provided in the steam supply piping.

According to the present invention, the power generation system has the steam valve that can suppress the abrasion of the stop valve such that it is possible to reduce a maintenance frequency of the steam valve and improve an operation efficiency of the power generation system.

In order to solve the above-identified problem, a power generation system according to an embodiment of the present invention has the steam valve, a boiler configured to generate steam, a steam turbine driven by the steam, a steam supply piping configured to connect the boiler and the steam turbine to supply the steam to the steam turbine, and a display apparatus configured to achieve the opening degree of the stop valve according to the distance between the sensor and the base end surface and display the opening degree of the stop valve on a display screen, wherein the steam valve is provided in the steam supply piping.

According to the present invention, the display apparatus configured to achieve the opening degree of the stop valve according to the distance between the sensor and the base end surface and display the opening degree of the stop valve on a display screen is provided such that an operator can recognize the opening degree of the stop valve.

In order to solve the above-identified problem, according to a steam valve according to an embodiment of the present invention, a tubular stop valve configured to move toward an upper end side along a direction of an axis when the stop valve is opened and move toward the lower end side along the direction of the axis when the stop valve is closed, a valve main body configured to accommodate the stop valve, and a detection mechanism configured to detect an open/close state of the stop valve or detect a distance between a detection surface included in the detection mechanism and the stop valve.

According to the present invention, the detection mechanism having the above-described configuration is provided such that the open/close state or the opening degree of the stop valve can be determined.

In a steam valve according to an embodiment of the present invention, a base end portion including an end portion of the stop valve at the upper end side in the direction of the axis may be accommodated in a first accommodation space formed in the valve main body, the base end portion may have a rod-shaped member configured to penetrate a part of the valve main body facing a base end surface of the base end portion and have an end coming in contact with the base end surface of the base end portion, an elastic-force-apply portion configured to apply an elastic force with respect to the rod-shaped member so as to maintain the state in which the end of the rod-shaped member comes in contact with the base end surface, and a detection portion configured to face another end of the rod-shaped member in the direction of the axis and to detect a full open state of the stop valve by coming in contact with the other end of the rod-shaped member.

The rod-shaped member, the elastic-force-apply portion, and the detection portion described above are provided such that it is possible to detect whether the stop valve is in a full open state.

In a steam valve according to an embodiment of the present invention, the base end portion may have a plurality of inclination surfaces formed on an outer circumference of the base end portion, the plurality of inclination surfaces being inclined such that a distance from the axis to each of the plurality of inclination surfaces decreases toward the upper end side in the direction of the axis, an outer circumferential surface may be formed in the first accommodation space to surround the plurality of inclination surfaces while facing the base end portion in a diameter direction of the base end portion, and the detection mechanism may have a sensor configured to determine a distance between the outer circumferential surface and the plurality of inclination surfaces.

In this manner, the sensor configured to determine the distance from the outer circumferential surface of the valve main body to the plurality of inclination surfaces is provided such that the open/close state of the stop valve can be estimated.

In order to solve the above-identified problem, a power generation system according to an embodiment of the present invention has the steam valve, a boiler configured to generate steam, a steam turbine driven by the steam, and a steam supply piping configured to connect the boiler and the steam turbine to supply the steam to the steam turbine, wherein the steam valve is provided in the steam supply piping.

According to the present invention, it is possible to detect whether the stop valve is in the full open state while operating the power generation system.

In order to solve the above-identified problem, a power generation system according to an embodiment of the present invention has the steam valve, a boiler configured to generate steam, a steam turbine driven by the steam, a steam supply piping configured to connect the boiler and the steam turbine to supply the steam to the steam turbine, and a display apparatus configured to achieve the opening degree of the stop valve according to the distance between the sensor and the base end surface and display the opening degree of the stop valve on a display screen, wherein the steam valve is provided in the steam supply piping.

According to the present invention, the display apparatus configured to achieve the opening degree of the stop valve according to the distance from the sensor to the plurality of inclination surfaces and display the opening degree of the stop valve on a display screen is provided such that the operator can recognize the opening degree of the stop valve.

Advantageous Effects of Invention

According to the present invention, the abrasion of the stop valve can be suppressed. According to the present invention, the open/close state of the stop valve can be detected.

DESCRIPTION OF EMBODIMENTS

Hereinafter, embodiments to which the present invention is applied will be described in detail with reference to the drawings.

First Embodiment

Figure 1:
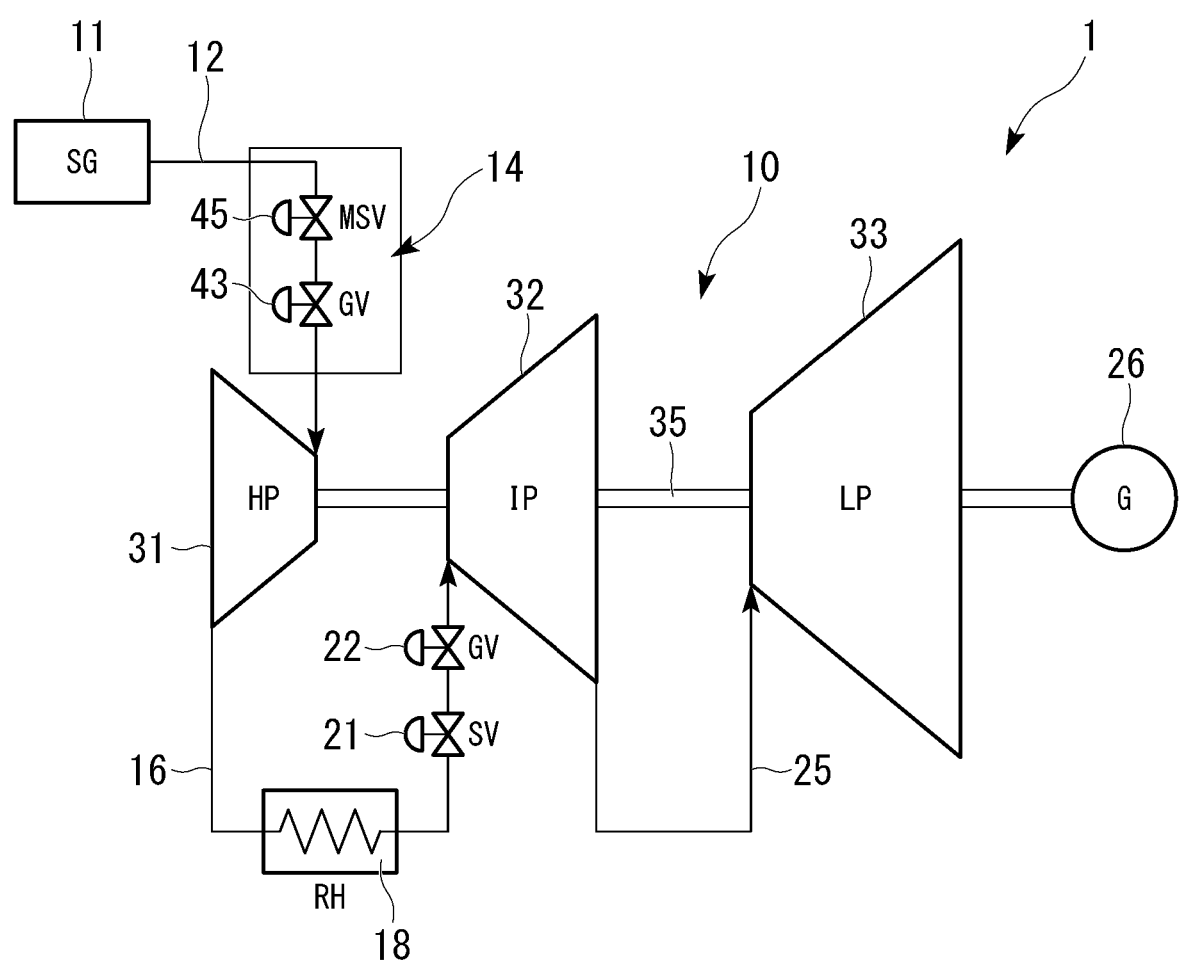
FIG. 1 is a system diagram showing a schematic configuration of a power generation system according to a first embodiment of the present invention.

A power generation system 1 including a steam turbine 10 according to a first embodiment of the present invention will be described by referring to FIG. 1.

The power generation system 1 includes the steam turbine 10, a boiler 11, a first steam supply piping (steam supply piping) 12, a steam valve 14 including a regulation valve 43 and a stop valve 45, a second steam supply piping 16, a reheater 18, a stop valve 21, a regulation valve 22, a third steam supply piping 25, and a generator 26.

The steam turbine 10 includes a high-pressure steam turbine 31, a middle-pressure steam turbine 32, and a low-pressure steam turbine 33. The middle-pressure steam turbine 32 is disposed between the high-pressure steam turbine 31 and the low-pressure steam turbine 33.

The high-pressure steam turbine 31, the middle-pressure steam turbine 32, and the low-pressure steam turbine 33 have a rotation shaft 35 extent along one direction. The rotation axis has a rotation axis main body and a plurality of rotor vanes (not shown) formed therein.

The rotation shaft 35 is rotated due to the steam supplied to the high-pressure steam turbine 31, the middle-pressure steam turbine 32, and the low-pressure steam turbine 33 so as to generate electric power.

The boiler 11 is connected to an end of the first steam supply piping 12. The boiler 11 is configured to generate the steam with a high pressure (hereinafter described as "high-pressure steam"). The high-pressure steam generated by the boiler 11 is supplied to the inside of the first steam supply piping 12.

The first steam supply piping 12 has another end connected to an inlet of the high-pressure steam turbine 31. The first steam supply piping 12 is the piping configured to lead the high-pressure steam generated in the boiler 11 to the high-pressure steam turbine 31.

Figure 2:
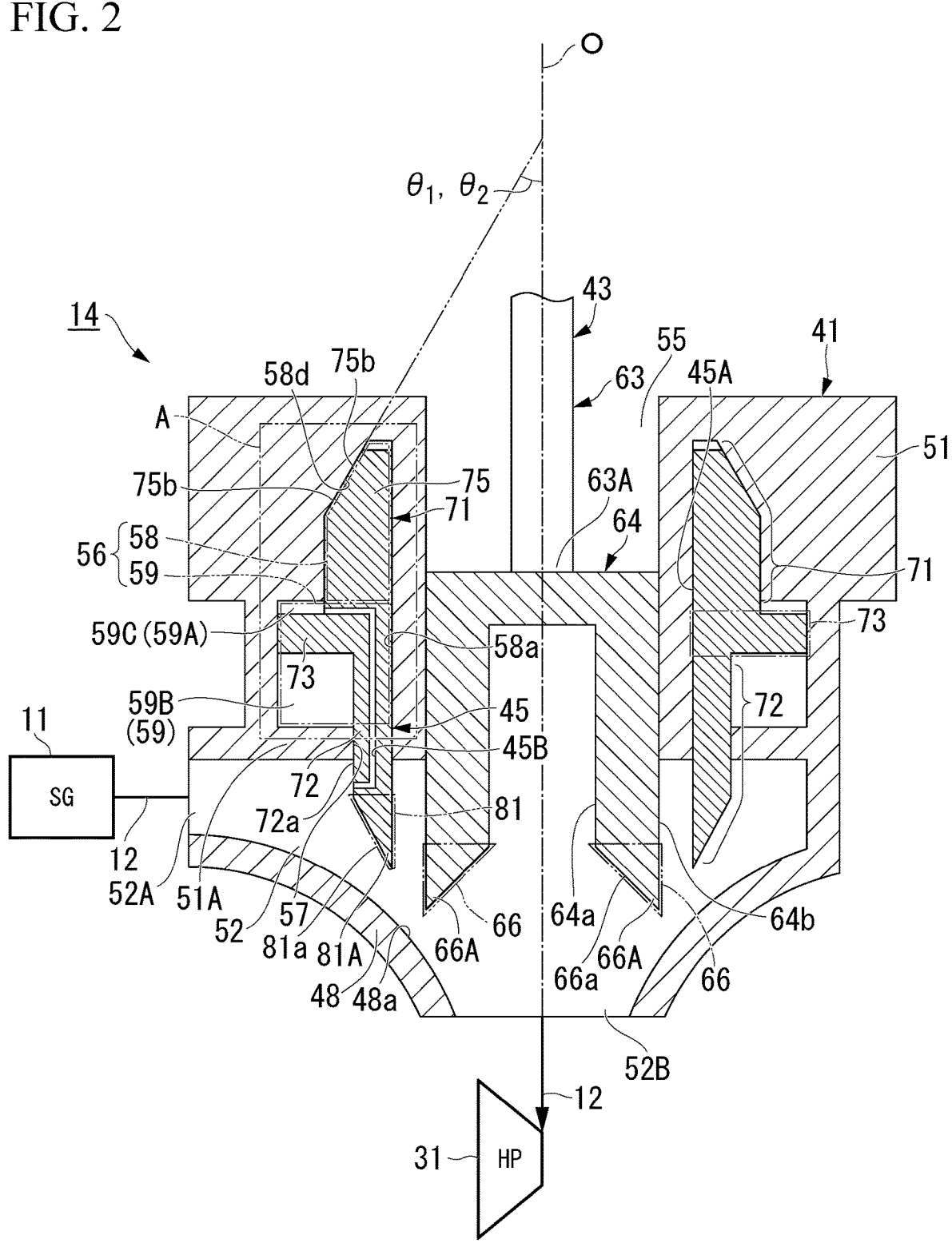
FIG. 2 is a sectional view of the steam valve shown in FIG. 1 to schematically show a state in which the stop valve and the regulation valve are fully closed.

Next, the steam valve 14 will be described by referring to FIGS. 1-7. In FIG. 2, reference signs "A" and "O" indicate a region (hereinafter described as "region A") and an axis (hereinafter described as "axis O") of the steam valve 14 respectively.

Figure 4:
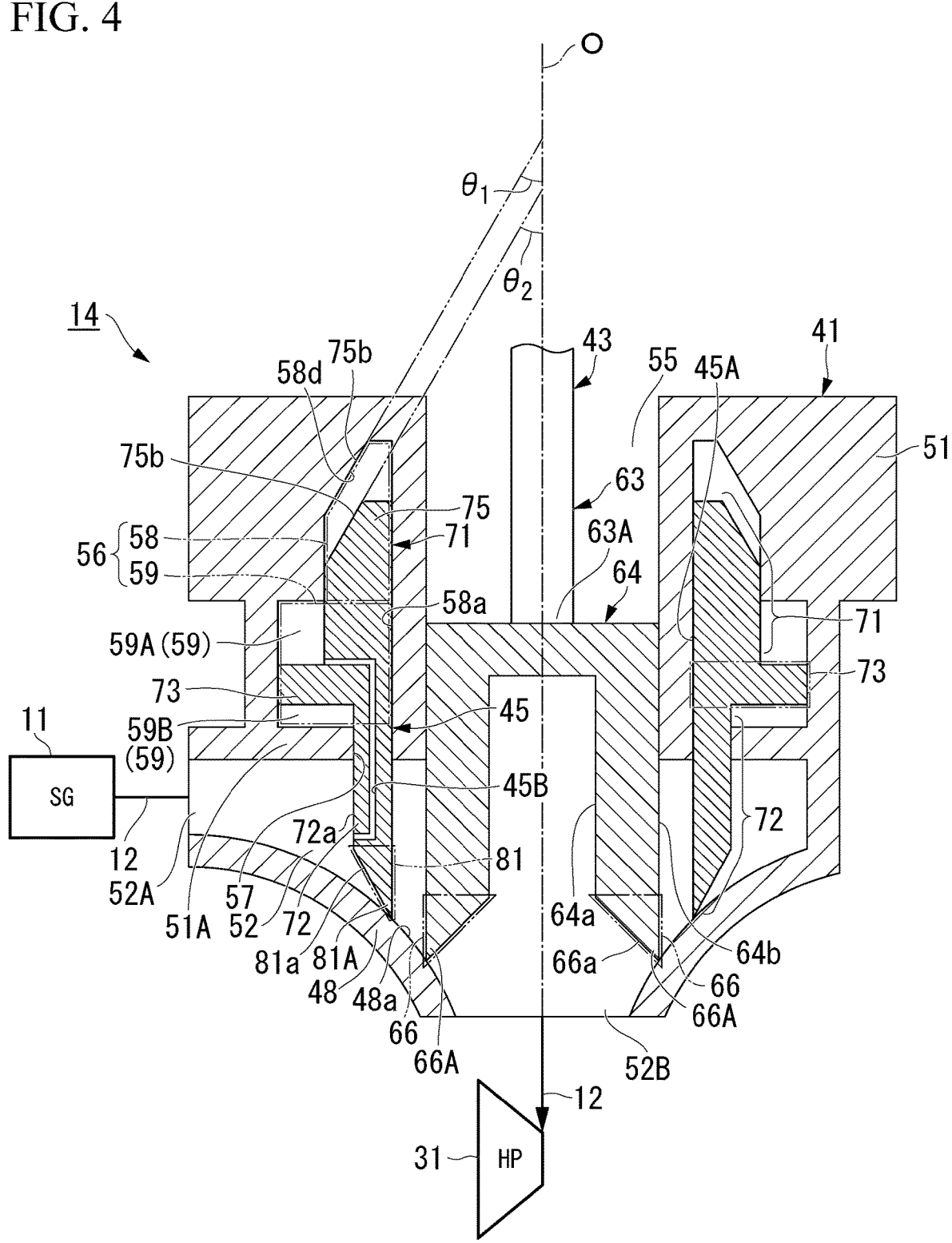
FIG. 4 is a sectional view of the steam valve shown in FIG. 1 to schematically show a state in which the stop valve and the regulation valve are fully closed.

In FIG. 4, a reference sign θ1 (hereinafter described as "inclination angle θ1") indicates an inclination angle of a contact surface 58d with respect to the axis O, and a reference θ2 (hereinafter described as "inclination angle θ2") indicates an inclination angle of an inclination surface 75b with respect to the axis O.

The steam valve 14 is configured in the first steam supply piping 12. The steam valve 14 has a valve main body 41, a regulation valve 43, and a stop valve 45.

The valve main body 41 has a valve seat 48, a valve accommodation member 51, and a steam flow passage 52.

The valve seat 48 has an inner surface 48a with which tip ends of the regulation valve 43 and the stop valve 45 contact. The inner surface 48a is formed as a curved surface. The inner surface 48a partitions a part of the steam flow passage 52.

The valve accommodation member 51 is disposed at the valve seat 48 in a state in which the steam flow passage 52 can be partitioned.

The valve accommodation member 51 has a regulation-valve-accommodation space 55, a stop-valve-accommodation space 56, and a penetration portion 57.

The regulation-valve-accommodation space 55 is formed to be a cylindrical space formed in a central portion of the valve accommodation member 51. The regulation-valve-accommodation space 55 extends in the direction of the axis O. The regulation-valve-accommodation space 55 is partitioned by the inner circumferential surface 51a of the valve accommodation member 51 in the diameter direction.

The stop-valve-accommodation space 56 is a ring-shaped space formed outward with respect to the regulation-valve-accommodation space 55. The stop-valve-accommodation space 56 is disposed at the upper side of the steam flow passage 52.

The stop-valve-accommodation space 56 has a first accommodation space 58 and a second accommodation space 59. The first accommodation space 58 and the second accommodation space 59 are disposed in the direction of the axis O.

The first accommodation space 58 is partitioned by an upper portion of the inner circumferential surface 58a, a first opposition surface 58b, and an outer circumferential surface 58c formed in the valve main body 41, and the plurality of contact surface 58d, wherein the first accommodation space 58 is formed to accommodate a base end portion 75 of the stop valve 45 in a movable state in the direction of the axis O.

The inner circumferential surface 58a is disposed outward with respect to the regulation-valve-accommodation space 55. The inner circumferential surface 58a is a surface extent in the direction of the axis O while being orthogonal with respect to the diameter direction of the axis O.

The first opposition surface 58b is a surface facing the base end surface 75a of the stop valve 45. The first opposition surface 58b is a ring-shaped surface orthogonal to the axis O. The first opposition surface 58b is connected with the inner circumferential surface 58a and the plurality of contact surfaces 58d.

The outer circumferential surface 58c is disposed at the outside of the inner circumferential surface 58a so as to surround the upper portion of the inner circumferential surface 58a. An interval between the outer circumferential surface 58c and the inner circumferential surface 58a along the circumferential direction of the outer circumferential surface 58c is constant.

The interval between the outer circumferential surface 58c and the inner circumferential surface 58a is determined such that the base end portion 75 of the stop valve 45 can be moved in the direction of the axis O. The outer circumferential surface 58c and the inner circumferential surface 58a are formed as guide surfaces at the time of guiding the base end portion 75 in the direction of the axis O.

Each of the plurality of contact surfaces 58d connects with the first opposite surface 58b and the outer circumferential surface 58c. The plurality of contact surfaces are inclination surfaces with respect to the axis O. The plurality of contact surfaces 58d are disposed in the circumferential direction of the stop-valve-accommodation space 56.

When the stop valve 45 is operated to make the steam flow passage 52 in the full open state, the plurality of contact surfaces 58d come in contact with the inclination surface 75b formed in the base end portion 75 of the stop valve 45.

The inclination angle $\theta 1$ of each contact surface $58d$ with respect to the axis O is configured to be equal to the inclination angle $\theta 2$ of the inclination surface $75b$ of the stop valve.

In this manner, the inclination angle G1 of each contact surface $58d$ with respect to the axis O is equal to the inclination angle $\theta 2$ of the inclination surface $75$ of the stop valve $45$ such that the inclination surface $75$ of the stop valve $45$ can contact with the contact surface $58d$.

A low-pressure space $58A$ is formed between the valve main body $41$ and the base end portion $75$ of the stop valve $45$ which partition the first accommodation space $58$. The low-pressure space $58A$ is a part of the first accommodation space $58$ with a low pressure.

A volume of the low-pressure space $58A$ reaches a maximum value when the stop valve $45$ makes the steam flow passage $52$ to be fully closed, and the volume of the low-pressure space $58A$ gradually decreases according to the increased opening degree of the stop valve $45$. Accordingly, the volume of the low-pressure space $58A$ reaches a minimum value in the state in which the stop valve $45$ make the steam flow passage $52$ to be fully opened (a state in which the movement of the stop valve $45$ toward the upper side in the direction of the axis O is finished, see FIG. 2).

In this state, the low-pressure space $58A$ disposed between the first opposition surface $58b$ and the base end surface $75a$ of the base end portion $75$ in the direction of the axis O is defined as a first gap $58B$.

Accordingly, in the state in which the movement of the stop valve $45$ toward the upper side in the direction of the axis O is finished, since the first gap $58B$ is formed between the base end portion $75$ accommodated in the first accommodation space $58$ and the valve main body $41$, it is possible to prevent the base end portion $75$ and the enlarged diameter portion $73$ from colliding with the valve main body $41$ in the direction of the axis O.

Accordingly, it is possible to suppress the abrasion of the base end portion $75$ and the enlarged diameter portion $73$ due to the collision of the valve main body $41$ with respect to the base end portion $75$ and the enlarged diameter portion $73$ in the direction of the axis O.

The second accommodation space $59$ is disposed between the first accommodation space $58$ and the steam flow passage $52$ in the direction of the axis O.

The second accommodation space $59$ is partitioned by a lower part of the inner circumferential surface $58a$, a second opposition surface $59a$, a bottom surface $59b$, and an outer circumferential surface $59c$ formed in the valve main body $41$, wherein the second accommodation space $59$ is formed such that the second accommodation space $59$ accommodates the enlarged diameter portion $73$ of the stop valve $45$ in a state in which the enlarged diameter portion $73$ can be moved in the direction of the axis O.

The first accommodation space $58$ and the second accommodation space $59$ are dividedly formed to accommodate the base end portion $75$ and the enlarged diameter portion $73$ of the stop valve $45$ respectively.

The second opposition surface $59a$ is a surface formed to face a surface $73a$ of the enlarged diameter portion $73$ of the stop valve $45$. The second opposition surface $59$ is formed in a ring shape, and orthogonal to the axis O. The second opposition surface $59a$ is connected with the outer circumferential surface $58c$, $59c$.

The bottom surface $59b$ is a surface formed to face a surface $73b$ of the enlarged diameter portion $73$. The bottom surface $59b$ is formed in a ring shape, and orthogonal to the axis O. The bottom surface $59b$ is connected with the outer circumferential surface $59c$.

The outer circumferential surface $59c$ is disposed at the outside of the inner circumferential surface $58a$ so as to surround the lower portion of the inner circumferential surface $58a$. The outer circumferential surface $59c$ is formed more outwardly with respect to the outer circumferential surface $58c$. Accordingly, the second accommodation space is formed to be wider than the first accommodation space $58$ in the diameter direction of the valve main body $41$.

A high-pressure space $59A$ and a pressure space $59B$ are formed between the valve main body $41$ and the stop valve $45$ which partition the second accommodation space $59$.

The high-pressure space $59A$ is a surface disposed at the side of the base end portion $75$ of the stop valve $45$. The high-pressure space $59A$ is formed to communicate with the steam flow passage $52$ via the flow passage $45B$ formed in the stop valve $45$.

The high-pressure space $59A$ is formed to have a pressure higher than that in the low-pressure space $58A$. The high-pressure space $59A$ is formed to be a space as a part of the second accommodation space with a high pressure.

A volume of the high-pressure space $59A$ reaches a maximum value when the stop valve $45$ makes the steam flow passage $52$ to be fully closed, and the volume of the high-pressure space $59A$ gradually decreases according to the increased opening degree of the stop valve $45$.

Furthermore, the volume of the high-pressure space $59A$ reaches a minimum value in the state in which the stop valve $45$ make the steam flow passage $52$ to be fully opened (a state in which the movement of the stop valve $45$ toward the upper side in the direction of the axis O is finished, see FIG. 2).

In this state, the high-pressure space $59A$ disposed between the surface $73a$ (formed on the side of the based end portion $75$) of the enlarged diameter portion $73$ and the second opposition surface $59a$ of the based end portion $75$ in the direction of axis O is defined as a second gap $59C$.

In this manner, in the state in which the movement of the stop valve $45$ toward the lower side in the direction of the axis O is finished, since the second gap $59C$ is formed between the stop valve $45$ accommodated in the second accommodation space $59$ and the valve main body $41$, it is possible to prevent the enlarged diameter portion $73$ from colliding with the valve main body $41$ at the upper side in the direction of the axis O.

Accordingly, it is possible to suppress the abrasion of the stop valve $45$ due to the collision of the valve main body $41$ and the stop valve $45$ at the upper side in the direction of the axis O.

The pressure space $59B$ is a space disposed at the side of the base end portion $75$ of the stop valve $45$. The pressure space $59B$ is connected to a pressure regulation mechanism (not shown) so as to change the pressure of the pressure space $59B$ to the low pressure or the high pressure.

When the pressure in the pressure space $59B$ is adjusted to the low pressure, the stop valve $45$ is pressed toward the lower side in the direction of the axis O due to the pressure in the high-pressure space $59A$ such that the stop valve $45$ moves downwardly toward the valve seat $48$.

On the other hand, when the pressure in the pressure space $59B$ is adjusted to the high pressure, the stop valve $45$ is pressed toward the upper side in the direction of the axis O due to the pressure in the pressure space $59B$ such that the stop valve $45$ moves upwardly so as to be apart from the valve seat $48$.

The pressure space 59B is the space configured to adjust the open/close state and the opening degree of the stop valve 45.

The penetration portion 57 is formed to penetrate a plate portion 51A corresponding to the bottom surface 59b in the valve accommodation member 51. The penetration portion 57 is formed to extend in the direction of the axis O along the inner circumferential surface 58a. The penetration portion 57 is formed as a ring-shaped penetration portion.

The penetration portion 57 is inserted into the second part 72 of the stop valve 45. A tip end 66A of the stop valve 45 configuring the second part 72 is disposed in the steam flow passage 52. The second part 72 is configured so as to move the penetration portion 57 in the direction of the axis O.

The steam flow passage 52 is formed between the valve seat 48 and the valve accommodation member 51. The inner surface 48a of the valve seat 48 is exposed in the steam flow passage 52.

The steam flow passage 52 has an inlet port 52A and an outlet port 52B. The inlet port 52A of the steam flow passage 52 is connected to the boiler 11 via one side of the first steam supply piping 12. The inlet port 52A of the steam flow passage 52 is formed to introduce the high-pressure steam generated in the boiler 11.

The outlet port 52B of the steam flow passage 52 is connected to the high-pressure steam turbine 31 via the other side of the first steam supply piping 12.

In the state in which the stop valve 45 is open, the high-pressure steam turbine 31 is supplied with the high-pressure steam whose flow rate is adjusted by the regulation valve 43.

The regulation valve 43 is disposed at a downstream side with the position of the stop valve 45 along the direction of the steam flow.

The regulation valve 43 has a shaft portion 63 and a regulation valve main body 64.

The shaft portion 63 extends along the direction of the axis O. Part of the shaft portion 63 at a side of an end 63A thereof is disposed in the regulation accommodation space 55. The axis of the shaft portion 63 coincides with the axis O.

The shaft portion 63 is configured to be movable in the direction of the axis O.

The regulation valve main body 64 is disposed at the end 63A of the shaft portion. The regulation valve main body 64 is formed to be tubular and the regulation valve main body 64 has an open end at the side of the outlet port 52B of the steam flow passage 52. The regulation valve main body 64 has a tip end portion 66 facing the steam flow passage 52.

The tip end portion 66 is formed in a ring shape. The tip end portion 66 has an inclination surface 66a inclined along a direction from the inner circumferential surface 64a toward the outer circumferential surface 64b of the regulation valve main body 64. The tip end portion 66 has a tip end 66A facing the inner surface 48a of the valve seat 48 in the direction of the axis O.

When the regulation valve 43 is moved in the direction in which the tip end 66A approaches the valve seat 48 (toward the lower side of the direction of the axis O) as shown in FIG. 2, the flow rate of the high-pressure steam supplied to the high-pressure steam turbine 31 is reduced.

As shown in FIG. 4, when the tip end 66A comes in contact with the inner surface 48a of the valve seat 48, even if the stop valve 45 is in the open state, the supply of the high-pressure steam to the high-pressure steam turbine 31 is stopped.

The regulation valve 43 has the configuration described above is configured to control the flow rate of the high-pressure steam supplied to the high-pressure steam turbine 31 according to the load of the steam turbine 10.

The stop valve 45 is disposed at the outer side of the regulation valve 43. The stop valve 45 moves upwardly when the stop valve 45 is opened, and the stop valve 45 move downwardly when the stop valve 45 is closed. The stop valve 45 is formed in a tubular shape to surround the regulation valve 43, and a columnar hollow portion 45A in the stop valve 45 is formed to extend in the direction of the axis O. A flow passage 45B is formed in the stop valve 45 so as to communicate the high-pressure space 59A with the steam flow passage 52.

The stop valve 45 has the first part 71, the second part 72, and the enlarged diameter portion 73.

The first part 71 has an inner surface 71a, an outer surface 71b, and the base end portion 75.

When the stop valve 45 moves downwardly in the direction of the axis O, the inner surface 71a moves along the inner circumferential surface 58a formed in the valve main body 41 in the direction of the axis O.

When the stop valve 45 moves downwardly in the direction of the axis O, the state in which the upper portion of the outer circumferential surface 71b is in contact with the outer circumferential surface 58c formed on the valve main body 41 is maintained.

Accordingly, the separated state of the low-pressure space 58A and the high-pressure space 59A which have different pressures is constantly maintained.

Also, the inner circumferential surface 71a and the upper portion of the outer circumferential surface 71b configure the inner circumferential surface and the outer circumferential surface of the base end portion 75 respectively.

The base end portion 75 is the portion accommodated in the first accommodation space 58 when the movement of the stop valve 45 toward the upper side in the direction of the axis O is finished.

The base end portion 75 has the inner circumferential surface 71a, the outer circumferential surface 71b, the base end surface 75a, and the plurality of inclination surfaces 75b (for example, 4 inclination surfaces 75b according to the first embodiment).

The base end surface 75a is a surface facing the first opposition surface 58a formed in the valve main body 41. The base end surface 75a is formed to be orthogonal with respect to the axis O. In a top view, the base end surface 75a is formed in a square shape.

The plurality of inclination surfaces 75b is disposed in the circumferential direction of the base end portion 75. The plurality of inclination surfaces 75b are inclined such that the distance from the axis O to each of the plurality of inclination surfaces 75b decreases toward the upper side of the direction of the axis O.

In the state in which the movement of the stop valve toward the lower side in the direction of the axis O is finished and the base end portion 75 is accommodated in the first accommodation space 58, each of the plurality of inclination surfaces 75b comes in contact with one contact surface 58d.

As shown above, since the plurality of inclination surfaces 75b disposed in the circumferential direction of the base end portion 75 are inclined such that the distance from the axis O to each of the plurality of inclination surfaces 75b decreases toward the upper side of the direction of the axis O, and the inclined contact surfaces 58d formed in the part that partitions the first accommodation space 58 in the valve main body 41 come in contact with the plurality of inclination surfaces 75b when the stop valve 45 moves upwardly in the direction of the axis O, in the state in which the inclined contact surface 58d comes in contact with corresponding inclination surface 75b among the plurality of inclination surfaces 75b, it is possible to regulate the position of the base end portion 75 in the first accommodation space 58.

Accordingly, since it is possible to suppress the rattling of the stop valve 45 in the valve main body 41 and the rotation of the stop valve 45 in the valve main body 41, the abrasion of the stop valve 45 due to the rattling of the stop valve 45 in the valve main body 41 and the rotation of the stop valve 45 in the valve main body 41.

The inclination angle θ2 of each of the plurality of inclination angles 75b with respect to the axis O may be determined, for example, in a region from 10 degrees to 60 degrees.

For example, when the inclination angle θ2 of each of the plurality of inclination angles 75b with respect to the axis O is smaller than 10 degrees, the length of the first accommodation space 58 in the direction of the axis O becomes longer so as to lead to an enlargement of the valve main body 41 which is not preferable.

On the other hand, if the inclination angle θ2 of each of the plurality of inclination surfaces 75b with respect to the axis O is larger than 60 degrees, a pressing force in the direction of the axis O increases while the friction force between each of the plurality of inclination surfaces 75b and corresponding contact surface 58d increases. Accordingly, it is possible that in the state in which the inclination surface 75b comes in contact with the contact surface 58d, the stop valve 45 is difficult to move downwardly toward the valve seat 48 in the direction of the axis O, and such situation is not preferable.

Accordingly, by determining the inclination angle θ2 of each of the plurality of inclination surfaces 75b with respect to the axis O in the range from 10 degrees to 60 degrees, it is possible to suppress the enlargement of the valve main body 41 and cause the stop valve 45 to move smoothly in the direction of the axis O, further to suppress the abrasion of the stop valve 45.

The second part 72 is connected to the first part 71 via the enlarged diameter portion 73. The second part 72 is formed in a tubular shape, and the second part 72 extends in the direction of the axis O from the enlarged diameter portion 73 toward the valve seat 48. The second part 72 is inserted into the penetration portion 57.

The second part 72 has a tip end portion 81 disposed in the steam flow passage 52. The tip end portion 81 has an inclination surface 81a on the opposite side of the inclination surface 66a described above and a tip end 81A in contact with the inner surface 48a of the valve seat 48.

The second part 72 is configured such that a thickness of the second part 72 excluding the tip end portion 81 in the diameter direction is thinner than a thickness of the first part 71 excluding the base end portion 75 in the diameter direction.

The enlarged diameter portion 73 is disposed between the first part 71 and the second part 72, and the enlarged diameter portion 73 is formed in a ring shape. The enlarged diameter portion 73 is connected to the first part 71 and the second part 72 disposed in the direction of the axis O. The enlarged diameter portion 73 is accommodated in the second accommodation space 59.

The enlarged diameter portion 73 is configured to protrude outwardly in the diameter direction with respect to the outer circumferential surface of the first part 71 and the outer circumferential surface of the second part 72.

The enlarged diameter portion 73 includes surfaces 73a, 73b, and the outer circumferential surface 73c.

The surface 73a is a ring-shaped surface orthogonal to the axis O. The surface 73a is formed to face the second opposition surface 59a. The surface 73a together with the second opposition surface 59a partition the high-pressure space 59A.

The surface 73b is a ring-shaped surface orthogonal to the axis O, and the surface 73b is disposed at the opposite side with respect to the surface 73a. The surface 73b is formed to face the bottom surface 59b in the direction of the axis O. The surface 73b together with the bottom surface 59b partition the pressure space 59B. The outer circumferential surface 73c is in contact with the outer circumferential surface 59c formed in the valve main body 41.

When the stop valve 45 moves in the direction of the axis O, the enlarged diameter portion 73 moves in the direction of the axis O in the second accommodation space 59.

The second steam supply piping 16 has one end connected to the outlet port of the high-pressure steam turbine 31, and the other end thereof is connected to the inlet port of the middle-pressure steam turbine 32. The steam used in the high-pressure steam turbine 31 is discharged in the second steam supply piping 16.

The second steam supply piping 16 is configured as a piping for supplying the steam used in the high-pressure steam turbine 31 to the middle-pressure steam turbine 32.

The reheater 18 is disposed in the second steam supply piping 16. The reheater 18 is configured to generate the steam with middle pressure (hereinafter described as "middle-pressure steam") by heating the steam discharged from the high-pressure steam turbine 31. The generated middle-pressure steam is supplied to the downstream side of the reheater 18.

The stop valve 21 is disposed in the part of the second steam supply piping 16 at the downstream side of the reheater 18. The stop valve 21 has the same function with that of the stop valve 45 described above.

The regulation valve 22 is disposed in the part of the second steam supply piping 16 at the downstream side of the stop valve 21. The regulation valve 22 has the same function with that of the regulation valve 43 described above.

The third steam supply piping 25 has one end connected to the outlet port of the middle-pressure steam turbine 32, and the other end thereof is connected to the inlet port of the low-pressure steam turbine 33. The steam used in the middle-pressure steam turbine 32 so as to have the low pressure (hereinafter described as "low-pressure steam") is discharged to the third steam supply piping 25.

The low-pressure steam discharged to the third steam supply piping 25 is supplied to the low-pressure steam turbine 33.

The generator 26 is connected to one end of the rotation shaft 35. The generator 26 is driven by a rotation driving force of the steam turbine 10 via the rotation shaft 35.

According to the steam valve 14 according to the first embodiment, since the plurality of inclination surfaces 75b disposed in the circumferential direction of the base end portion 75 are inclined such that the distance from the axis O to each of the plurality of inclination surfaces 75b decreases toward the upper side of the direction of the axis O, and the inclined contact surfaces 58d formed in the part that partitions the first accommodation space 58 in the valve main body 41 come in contact with the plurality of inclination surfaces 75b when the stop valve 45 moves upwardly in the direction of the axis O, in the state in which the inclined contact surface 58d comes in contact with corresponding inclination surface 75b among the plurality of inclination surfaces 75b, it is possible to regulate the position of the base end portion 75 in the first accommodation space 58.

Accordingly, since it is possible to suppress the rattling of the stop valve 45 in the valve main body 41 and the rotation of the stop valve 45 in the valve main body 41, the abrasion of the stop valve 45 due to the rattling of the stop valve 45 in the valve main body 41 and the rotation of the stop valve 45 in the valve main body 41.

According to the power generation system 1 according to the first embodiment, the steam valve 14, the boiler 11, the steam turbine 10, and the first steam supply piping 12 disposed in the steam valve 14 while connecting to the boiler 11 and the steam turbine 10 are configured such that it is possible to decrease the maintenance frequency of the steam valve 14 and improve the operation efficiency of the power generation system 1.

Figure 3:
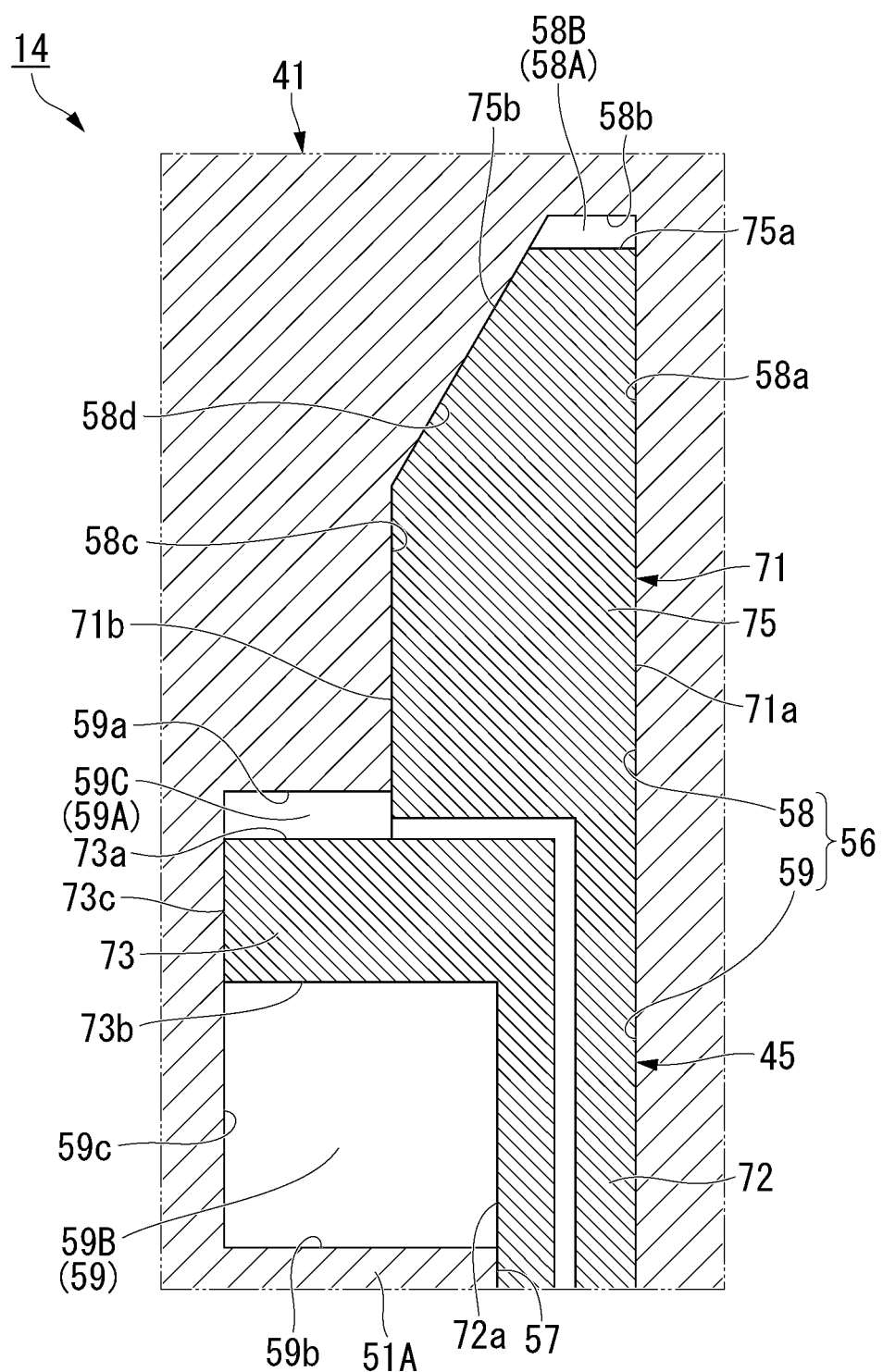
FIG. 3 is an enlarged sectional view showing a part surrounded by a region A in the steam valve shown in FIG. 2.
Figure 8:
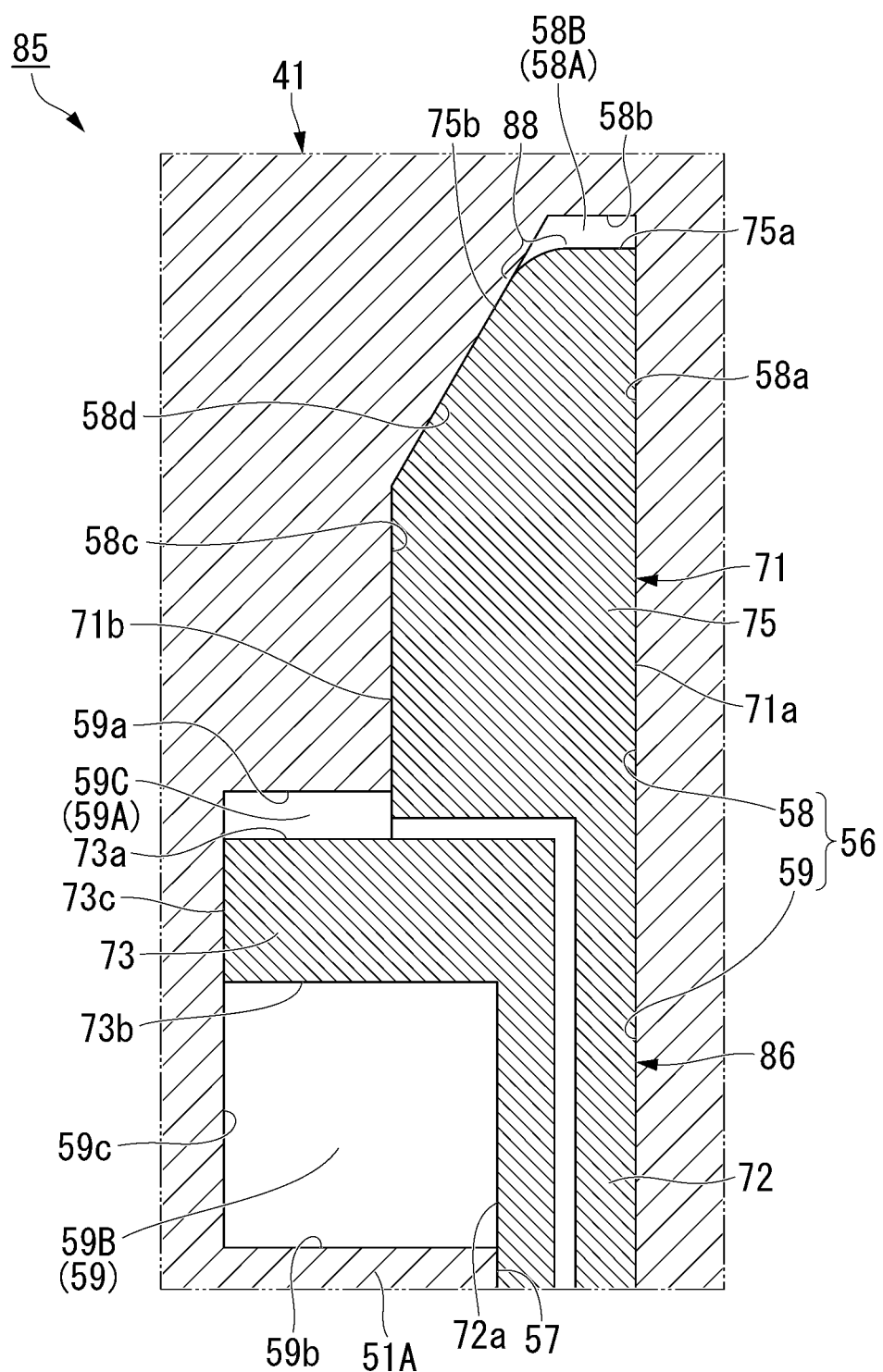
FIG. 8 is an enlarged sectional view showing a main part of a steam valve according to a modification example of the first embodiment of the present invention.

Next, a steam valve 85 according to a modification example of the first embodiment will be described by referring to FIG. 8. In FIG. 8, configurations same with that of the steam valve 14 according to the first embodiment as shown in FIG. 3 will be assigned with the same reference signs.

The steam valve 85 has the same configurations with the steam valve 14 except that the steam valve 85 has a stop valve 86 instead of the stop valve 45 configuring the steam valve 14 according to the first embodiment.

The stop valve 86 has the same configuration with the stop valve 45 except that a curved surface 88 is formed by chamfering the corner formed between the base end surface 75 and the plurality of inclination surfaces 75b of the stop valve 45 described in the first embodiment.

According to the steam valve 85 according to the modification example of the first embodiment, by forming the curved surface 88 between the base end surface 75 and the plurality of inclination surfaces 75b of the stop valve 45, it is possible to suppress the scuffing due to the friction generated between the contact surface 58d and the plurality of inclination surfaces 75b.

Figure 5:
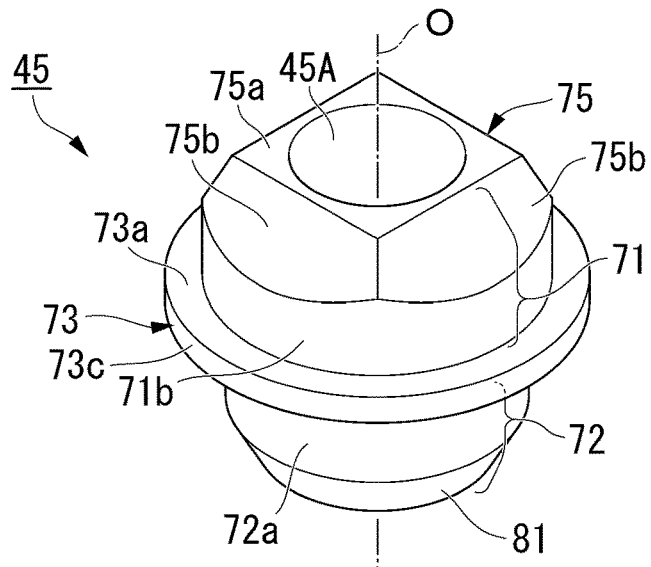
FIG. 5 is a perspective view of the stop valve shown in FIG. 2.
Figure 6:
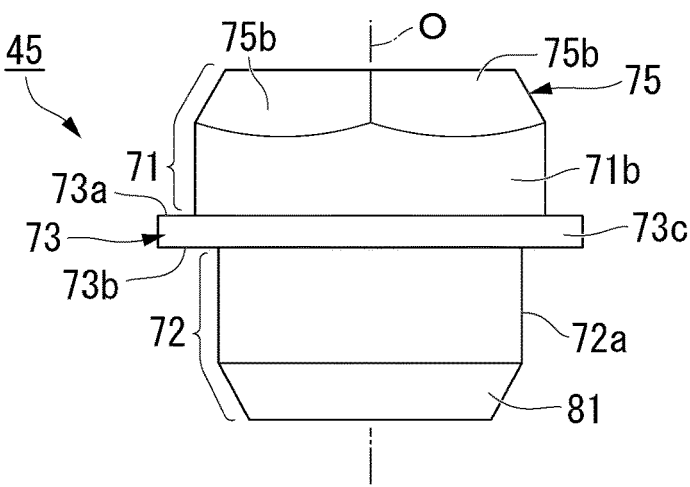
FIG. 6 is a side-view of the stop valve shown in FIG. 5.
Figure 7:
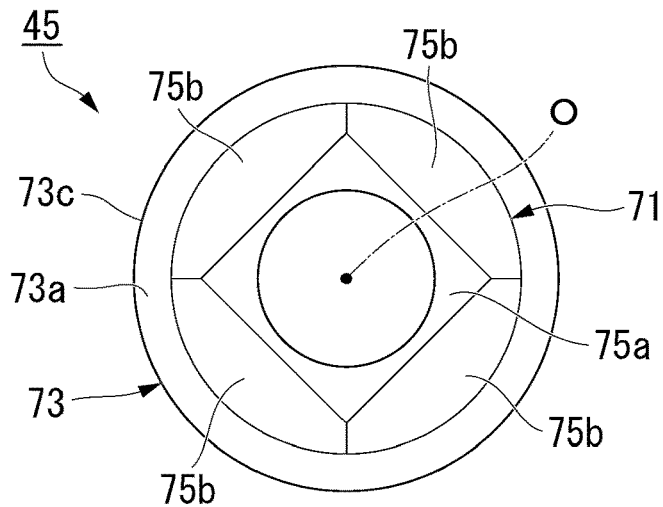
FIG. 7 is a top view of the stop valve shown in FIG. 5.
Figure 9:
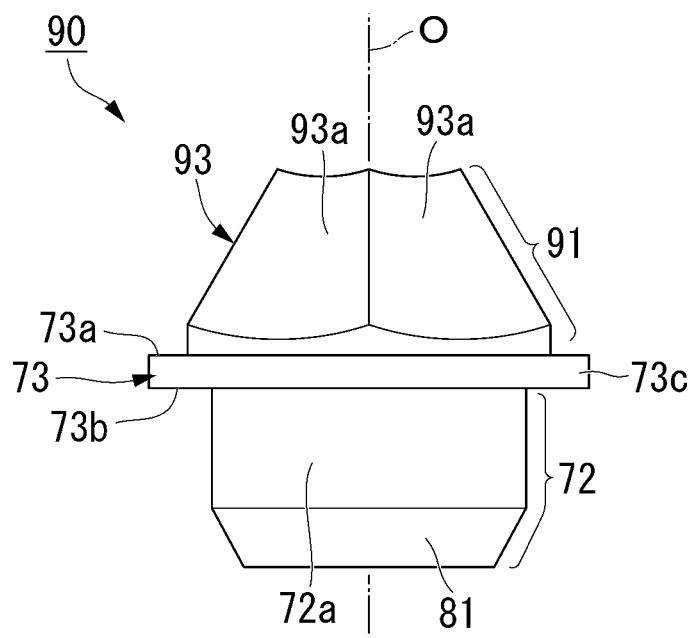
FIG. 9 is a side-view of the stop valve according to the first modification example of the first embodiment of the present invention.
Figure 10:
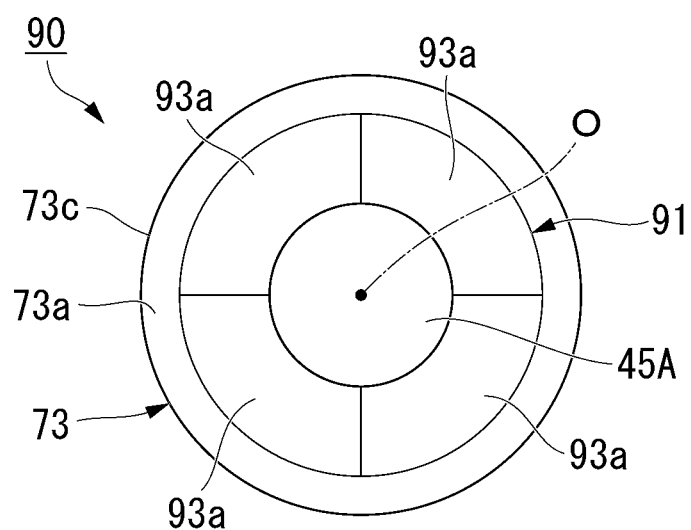
FIG. 10 is a top view of the stop valve according to the first modification example of the first embodiment of the present invention.

Next, a stop valve 90 according to a first modification example of the first embodiment will be described by referring to FIGS. 9 and 10. In FIG. 9, configurations same with that of the structure as shown in FIGS. 5-7 will be assigned with the same reference signs. In FIG. 10, configurations same with that of the structure as shown in FIG. 9 will be assigned with the same reference signs.

The stop valve 90 has the same configuration with the stop valve 45 except that the stop valve 90 has a first part 91 instead of the first part 71 configuring the stop valve 45 described in the first embodiment.

The first part 91 has the same configuration with the first part 71 except that the first part 91 has a base end portion 93 instead of the base end portion 75 configuring the first part 71.

The base end portion 93 has four inclination surfaces 93a disposed in the circumferential direction of the base end portion 93. In a top view of the base end portion 93, the upper end and the lower end of the four inclination surfaces 93a are formed in circular shapes.

The same effect with that of the steam valve 14 according to the first embodiment can be achieved by configuring the stop valve 90 having the configuration according to the first modification example of the first embodiment and forming four contact surfaces (not shown) which are in contact with the four inclination surfaces 93a formed in the stop valve 90.

Figure 11:
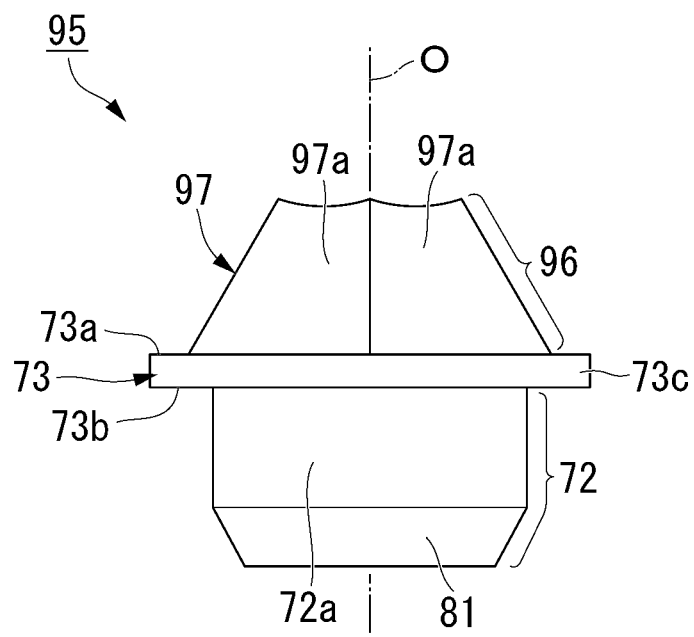
FIG. 11 is a side-view of the stop valve according to a second modification example of the first embodiment of the present invention.
Figure 12:
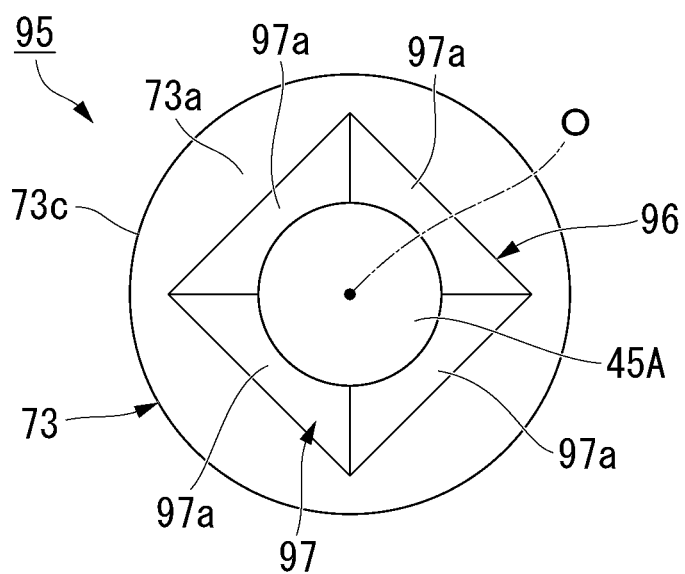
FIG. 12 is a top view of the stop valve according to the second modification example of the first embodiment of the present invention.

Next, a stop valve 95 according to a second modification example of the first embodiment will be described by referring to FIGS. 11 and 12. In FIG. 11, configurations same with that of the structure as shown in FIGS. 9 and 10 will be assigned with the same reference signs. In FIG. 12, configurations same with that of the structure as shown in FIG. 10 will be assigned with the same reference signs.

The stop valve 95 has the same configuration with the stop valve 90 except that the stop valve 95 has a first part 96 instead of the first part 91 configuring the stop valve 90 described in the first modification example.

The first part 96 has the same configuration with the first part 91 except that the first part 96 has a base end portion 97 instead of the base end portion 93 configuring the first part 91.

The base end portion 97 has four inclination surfaces 97a disposed in the circumferential direction of the base end portion 97. In a top view of the base end portion 97, the upper end of the four inclination surfaces 97a are formed in a circular shape.

The four inclination surface 97a extend to the surface 73a of the enlarged diameter portion 73. In a top view of the stop valve 95, the lower end of the four inclination surfaces 97a are formed in a quadrangle shape.

The same effect with that of the steam valve 14 according to the first embodiment can be achieved by configuring the stop valve 95 having the configuration according to the second modification example of the first embodiment and forming four contact surfaces (not shown) which are in contact with the four inclination surfaces 97a formed in the stop valve 95.

Figure 13:
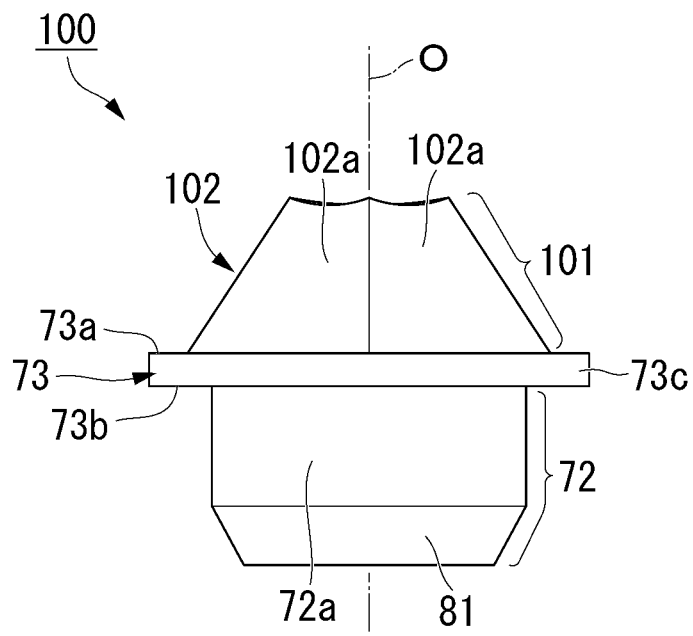
FIG. 13 is a side-view of the stop valve according to a third modification example of the first embodiment of the present invention.
Figure 14:
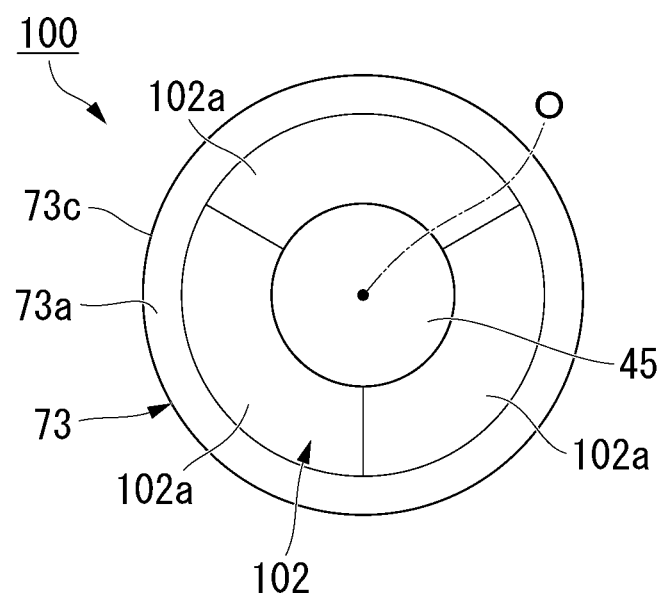
FIG. 14 is a top view of the stop valve according to the third modification example of the first embodiment of the present invention.

Next, a stop valve 100 according to a third modification example of the first embodiment will be described by referring to FIGS. 13 and 14. In FIG. 13, configurations same with that of the structure as shown in FIGS. 9 and 10 will be assigned with the same reference signs. In FIG. 14, configurations same with that of the structure as shown in FIG. 13 will be assigned with the same reference signs.

The stop valve 100 has the same configuration with the stop valve 90 except that the stop valve 100 has a first part 101 instead of the first part 91 configuring the stop valve 90 described in the first modification example.

The first part 101 has the same configuration with the first part 91 except that the first part 101 has a base end portion 102 instead of the base end portion 93 configuring the first part 91.

The base end portion 102 has the same configuration with that of the base end portion 93 except that the base end portion 102 has three inclination surfaces 102a disposed in the circumferential direction of the base end portion 102.

The same effect with that of the steam valve 14 according to the first embodiment can be achieved by configuring the stop valve 100 having the configuration according to the third modification example of the first embodiment and forming three contact surfaces (not shown) which are in contact with the three inclination surfaces 102a formed in the stop valve 100.

Second Embodiment

Figure 15:
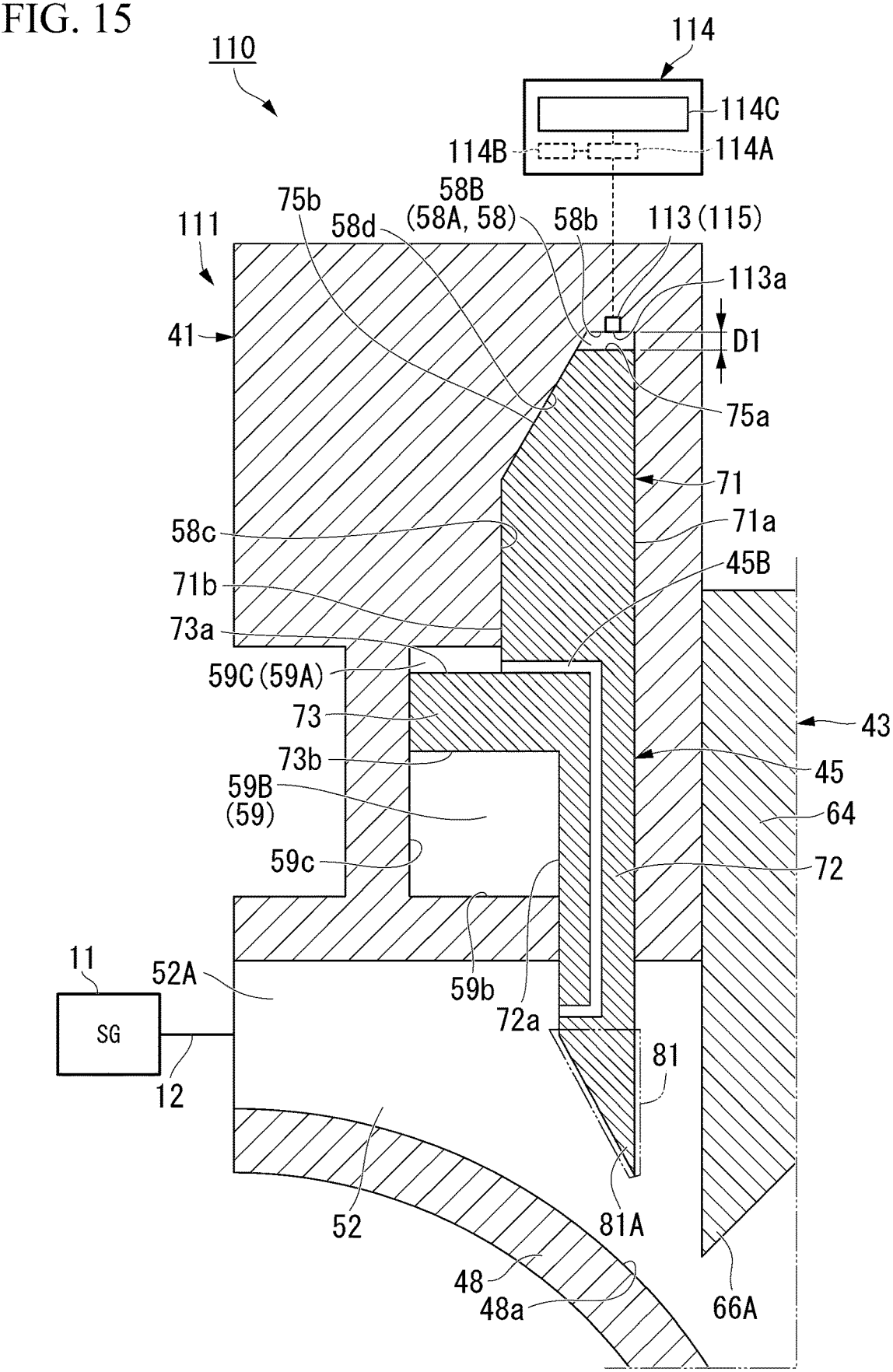
FIG. 15 is an enlarged view showing a part of a power generation system according to a second embodiment of the present invention and showing a cross section of a steam valve.

A power generation system 110 according to a second embodiment will be described by referring to FIG. 15. In FIG. 15, the configurations same with the structure as shown in FIG. 2 will be assigned with the same reference signs.

The power generation system 110 has the same configuration with that of the power generation system 1 except that the power generation system 110 has a steam valve 111 instead of the steam valve 14 configuring the power generation system 1 according to the first embodiment and further has a display apparatus 114.

The steam valve 111 has the same configuration with the steam valve 14 except for further having a detection mechanism 113 in addition to the configuration of the steam valve 14 according to the first embodiment.

The detection mechanism 113 has a detection surface 113a. The detection mechanism 113 is disposed in the valve main body 41 such that the detection surface 113a faces the base end surface 75a in the axial direction of the steam valve 111.

For example, a sensor 115 configured to determine a distance D1 from the detection surface 113a to the base end surface 75a can be used as the detection mechanism 113.

Various sensors such as an overcurrent sensor, an ultrasonic sensor, an electrostatic capacitance sensor, an optical sensor, and the like can be used as the sensor 115.

According to the detection mechanism 113 with such a configuration, for example, it is possible to estimate the open/close state of the stop valve 45 by figuring a corresponding table of the distance D1 to the stop valve 45 and the opening degree of the stop valve 45 in advance.

The display apparatus 114 has a memory portion 114A, an opening-degree-calculation portion 114B, and a display screen 114C.

Data indicating the relationship between the distance D1 and the opening degree of the stop valve 45 is stored in the memory portion 114A.

The opening-degree-calculation portion 114B is electrically connected to the detection mechanism 113 and the display screen 114C. The opening-degree-calculation portion 114B is configured to transmit information relating to the distance D1 determined by the detection mechanism 113.

The opening-degree-calculation portion 114B is configured to calculate the opening degree of the stop valve 45 according to the distance D1 determined by the detection mechanism 113 and the data stored in the memory portion 114A.

The display screen 114C is configured to display the opening degree of the stop valve 45 (for example, characters of "opening degree is 50%" are shown in a situation in which the opening degree is 50%) which is calculated by the opening-degree-calculation portion 114B.

According to the power generation system 110 according to the second embodiment, it is possible to display the opening degree of the stop valve 45 corresponding to the distance D1 determined by the detection mechanism 113 on the display screen 114C due to the detection mechanism 113 and the display apparatus 114. Thus, the operator can recognize the opening degree of the stop valve 45.

According to the power generation system 110 according to the second embodiment, due to the plurality of inclination surfaces 75b and the contact surfaces 58d being in contact with the plurality of inclination surfaces 75b described in the first embodiment, the same effect with the power generation system 1 according to the first embodiment can be achieved.

In the second embodiment, the stop valves 90, 95, 100 are provided as shown in FIGS. 9-14 instead of the stop valve 45, and contact surfaces corresponding to the inclination surfaces 93a, 97a, 102a of the stop valves 90, 95, 100 may be formed.

Third Embodiment

Figure 17:
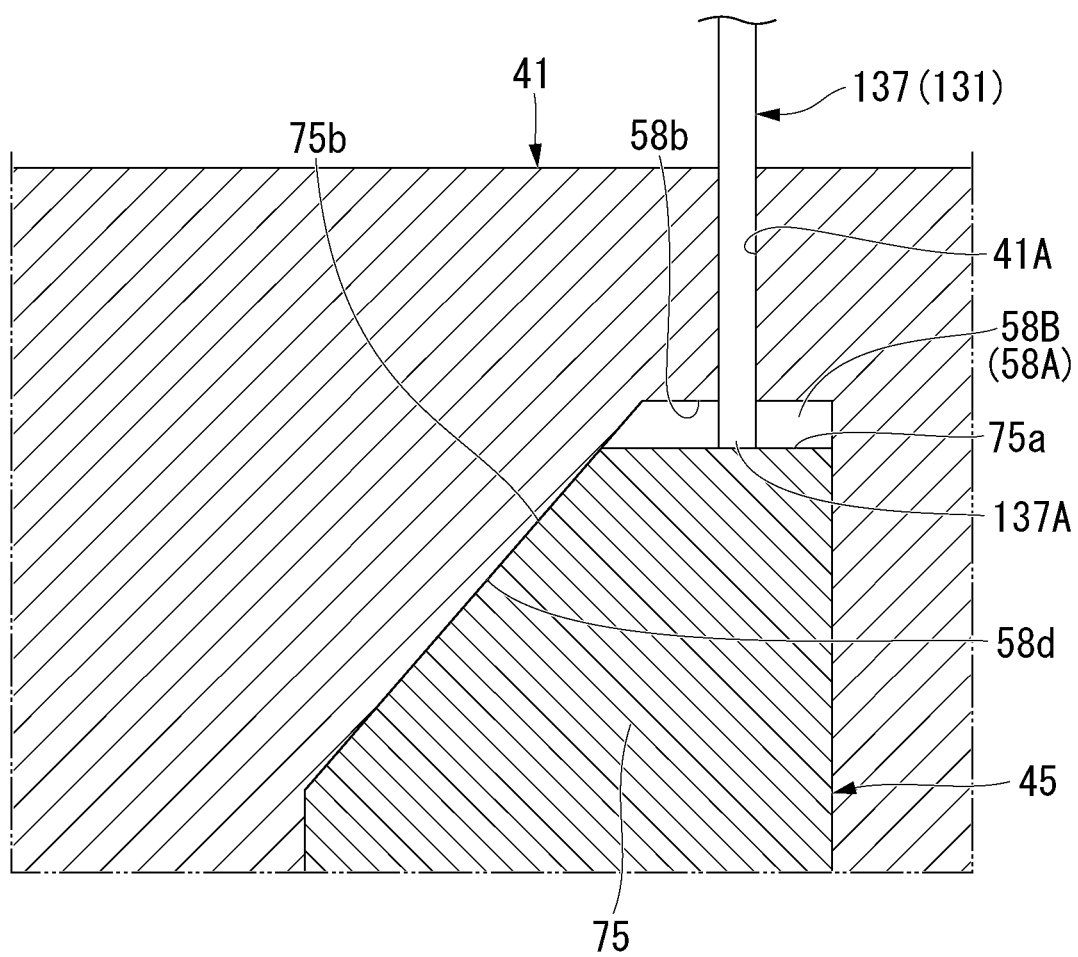
FIG. 17 is an enlarged sectional view showing a part surrounded by a region B in the steam valve shown in FIG. 16.
Figure 18:
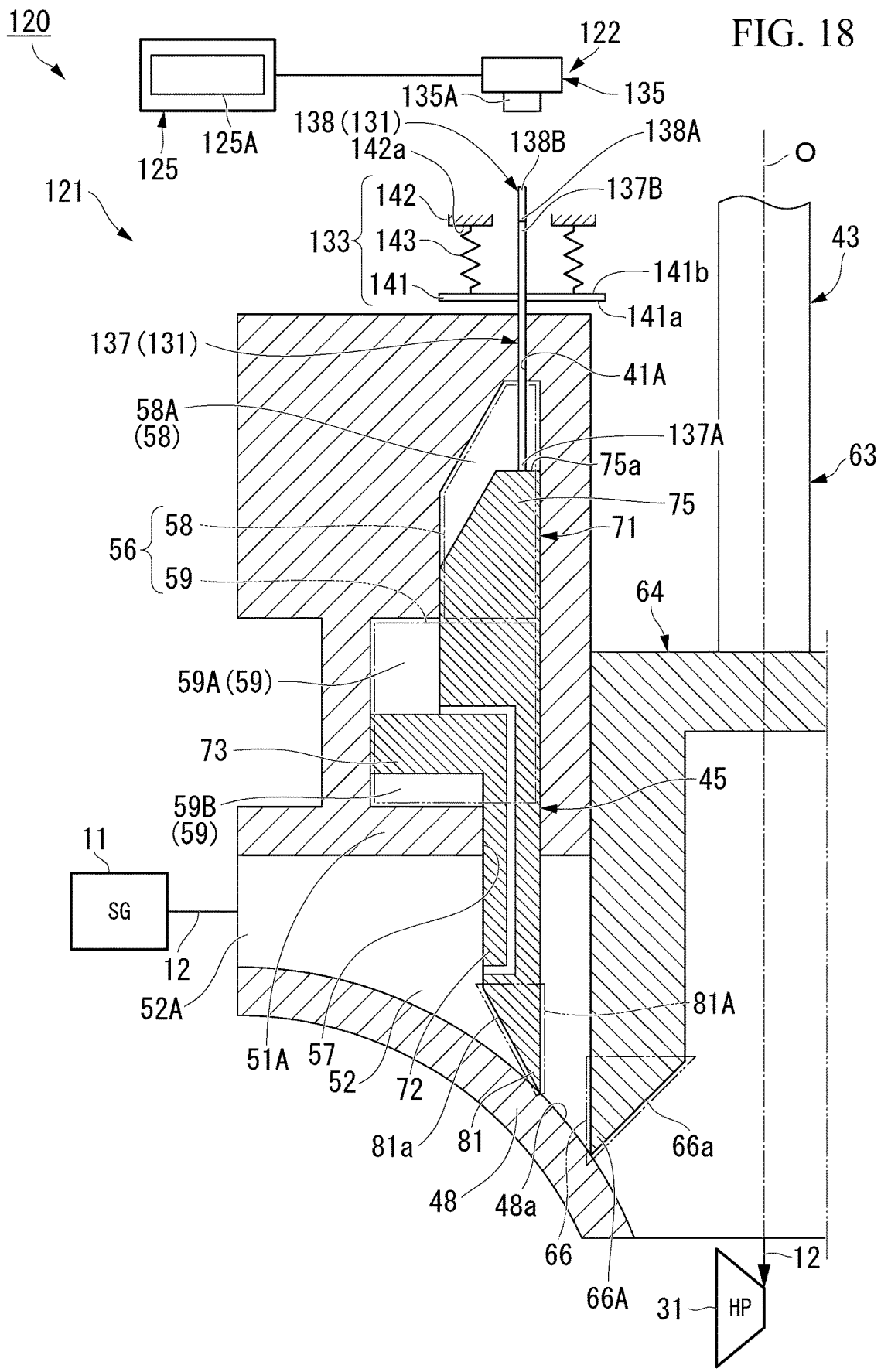
FIG. 18 is an enlarged sectional view showing a main part of a power generation system according to the third embodiment of the present invention and schematically showing a full close state of the stop valve and the regulation valve.

A power generation system 120 according to a third embodiment will be described by referring to FIGS. 16-18.

Figure 16:
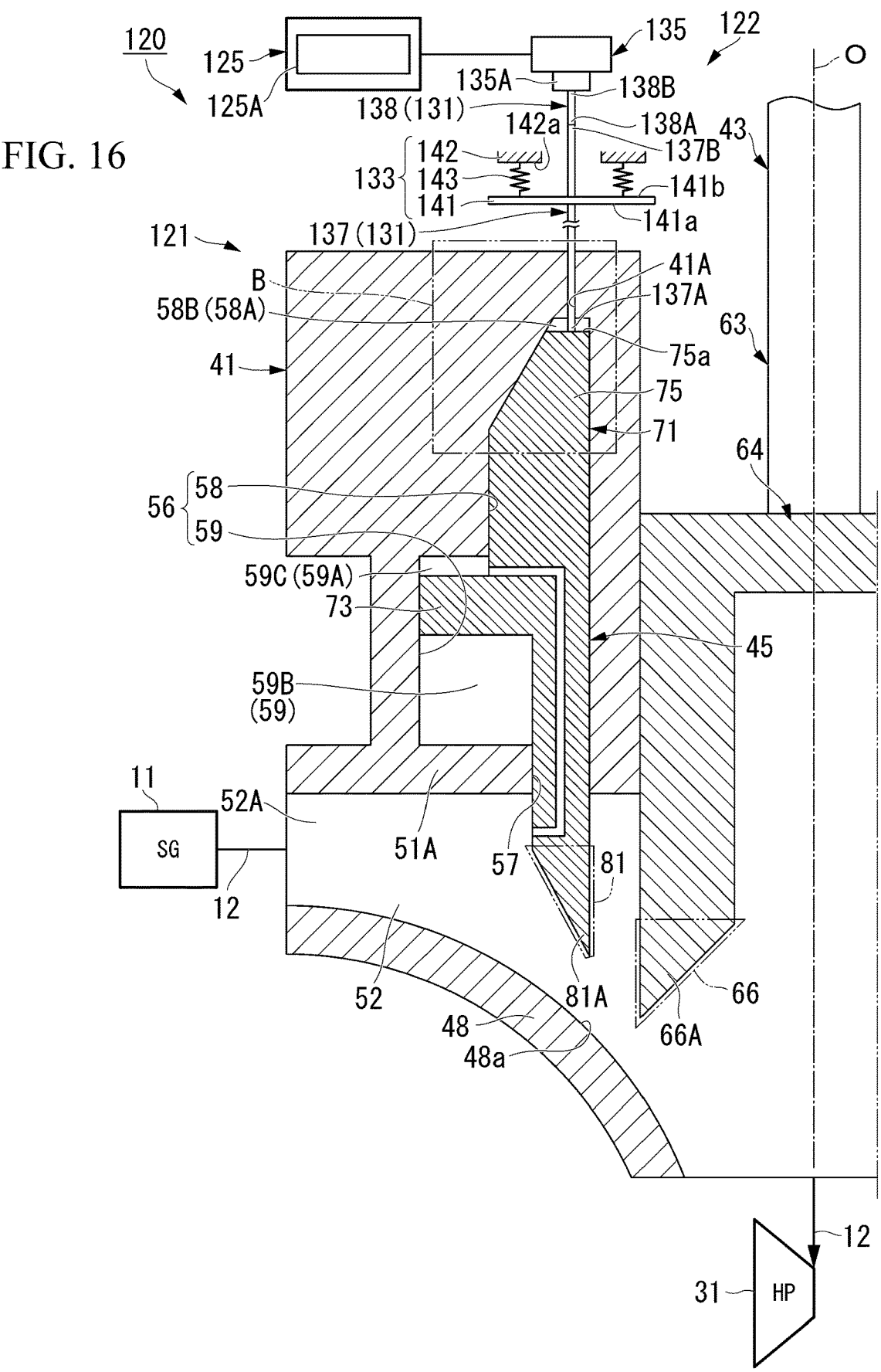
FIG. 16 is an enlarged sectional view showing a main part of a power generation system according to a third embodiment of the present invention and schematically showing a full open state of the stop valve and the regulation valve.

In FIG. 16, the configurations same with the structure as shown in FIG. 2 will be assigned with the same reference signs. In FIG. 16, the reference sign "B" indicates a region (hereinafter described as "region B"). In FIGS. 17 and 18, the configurations same with the structure as shown in FIG. 16 will be assigned with the same reference signs.

The power generation system 120 has the same configuration with the power generation system 1 except that the power generation system 120 has a steam valve 121 instead of the steam valve 14 configuring the power generation system 1 according to the first embodiment and further has a display apparatus 125.

The steam valve 121 has the same configuration with the steam valve 14 except that the steam valve 121 further has a detection mechanism 122 in addition to the configuration of the steam valve 14 described in the first embodiment and has a penetration hole 41A formed to penetrate the valve main body 41 opposite to the base end surface 75a in the direction of the axis O.

The detection mechanism 122 has a rod-shaped member 131, an elastic-force-apply portion 133, and a detection portion 135.

The rod-shaped member 131 has a first rod-shaped part 137 and a second rod-shaped part 138.

The first rod-shaped part 137 extends in the direction of the axis O. The first rod-shaped part 137 is inserted into the penetration hole 41A. A seal member for suppressing leakage is provided between the first rod-shaped part 137 and the penetration hole 41A.

The first rod-shaped part 137 is formed to have a part disposed in the valve main body 41 and the other part disposed outside of the valve main body 41.

The first rod-shaped part 137 has ends 137A, 137B disposed in the direction of the axis O. The end 137A comes in contact with the base end surface 75a positioned inside the first accommodation space 58. The end 137B is disposed outside the valve main body 41.

The second rod-shaped part 138 extends in the direction of the axis O. The second rod-shaped part 138 has ends 138A, 138B disposed in the direction of the axis O. The end 138A comes in contact with the end 137B of the first rod-shaped part 137. The end 138B is the part in contact with the detection portion 135.

The second rod-shaped part 138, for example, is preferable to be configured from a material having a high heat resistance.

In this manner, the second rod-shaped part 138 is formed in a material having a high heat resistance and more heat in the valve main body 41 can be transmitted to the second rod-shaped part 138 so as to prevent the detection portion 135 from being broken.

The rod-shaped member 131 is individually provided with respect to the valve main body 41. Accordingly, the rod-shaped member 131 is individually provided with respect to the valve main body 41 such that the effect of the rod-shaped member 131 due to the thermal expansion of the stop valve 45 can be suppressed.

The rod-shaped member 131 having the above-described configuration is configured to be movable in the direction of the axis O.

The elastic-force-apply portion 133 has a first elastic-body-fixation portion 141, a second elastic-body-fixation portion 142, and an elastic body 143.

The first elastic-body-fixation portion 141 is fixed to the outer circumferential surface of the first rod-shaped part 137 disposed on the outer side of the valve main body 41. The first elastic-body-fixation portion 141 is a plate-shaped member extending outwardly in the diameter direction from the outer circumferential surface of the first rod-shaped part 137.

The first elastic-body-fixation portion 141 has a surface 141*a* disposed at the side of the valve main body 41 and a surface 141*b* disposed at the opposite side of the surface 141*a*.

The second elastic-body-fixation portion 142 is provided at a position apart away from the first elastic-body-fixation portion 141 in the direction of the axis O. The second elastic-body-fixation portion 142 is a member whose position in the direction of the axis O does not change even if the first elastic-body-fixation portion 141 moves along the direction of the axis O.

The second elastic-body-fixation portion 142 has a surface 142*a* opposite to the surface 141*b* of the first elastic-body-fixation portion 141.

The elastic body 143 has one end fixed to the surface 141*b* of the first elastic-body-fixation portion 141 and the other end fixed to the surface 142*a* of the second elastic-body-fixation portion 142.

In other words, in the elastic body 143, one end is fixed to the first elastic-body-fixation portion 141 that is movable in the direction of the axis O, and the other end is fixed to the second elastic-body-fixation portion 142 which does not move in the direction of the axis O.

Accordingly, the elastic body 143 can always apply an elastic force in the direction of the axis O with respect to the rod-shaped member 131 via the first elastic-body-fixation portion 141. Accordingly, in the situation in which the stop valve 45 moves in the direction of the axis O, the state in which the end 137A of the rod-shaped member 131 is in contact with the base end surface 75*a* is maintained.

For example, springs can be used as the elastic body 143.

The detection portion 135 has a switch 135A. The switch 135A is disposed to face the end 138B of the rod-shaped member 131 (the second rod-shaped part 138) in the direction of the axis O.

The switch 135A is the part with which the end 138B of the rod-shaped member (the second rod-shaped part 138) comes in contact.

The detection portion 135 has the configuration shown above is fixed to the position. More specifically, the detection portion 135 is fixed to the position where the switch 135A is pressed by the end 138B of the rod-shaped member 131 when the stop valve 45 is in the full open state.

The display apparatus 125 is electrically connected to the detection portion 135 and has a display screen 125C.

The display apparatus 125 is configured to transmit a detection signal when the end 138B of the rod-shaped member 131 presses the switch 135A. The display apparatus 125 is configured to display that the stop valve 45 is in the full open state on the display screen 125C when the detection signal is received.

According to the power generation system 120 according to the third embodiment, the detection mechanism 122 and the display apparatus 125 are provided to detect whether the stop valve 45 is in the full open state without using an actuator.

The power generation system 120 according to the second embodiment has the plurality of inclination surfaces 75*b* described in the first embodiment and the contact surfaces that come in contact with the plurality of inclination surfaces 75*b* such that the same effect according to the power generation system 1 according to the first embodiment can be achieved.

Fourth Embodiment

Figure 19:
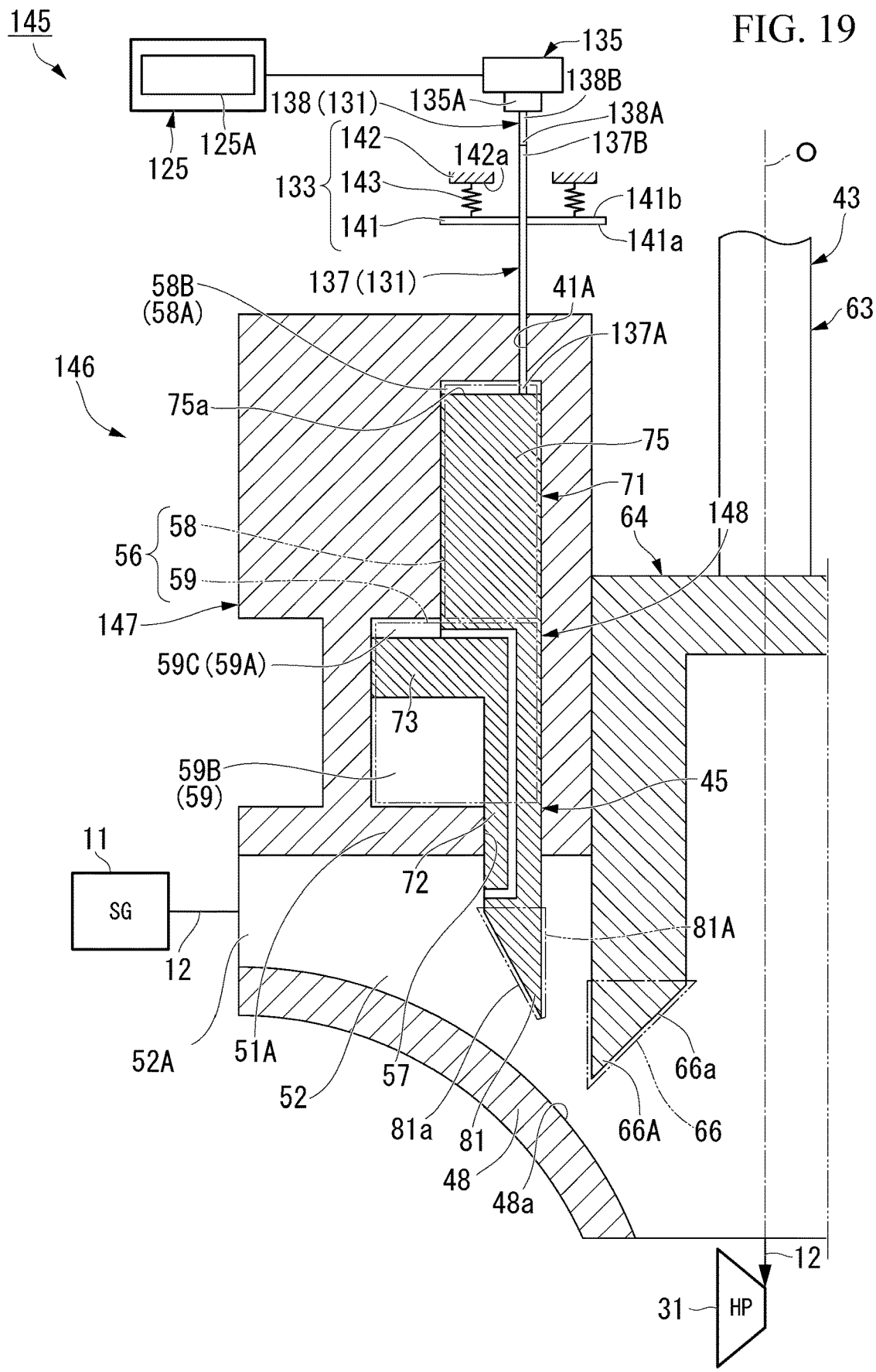
FIG. 19 is an enlarged sectional view showing a main part of a power generation system according to a fourth embodiment of the present invention and schematically showing a full open state of the stop valve and the regulation valve.

A power generation system 145 according to a fourth embodiment will be described by referring to FIG. 19. In FIG. 19, the configurations same with that of the structure shown in FIG. 16 will be assigned with the same reference signs.

The power generation system 145 has the same configuration with that of the power generation system 120 except that the power generation system 145 has a steam valve 146 instead of the steam valve 121 configuring the power generation system 120 according to the third embodiment.

The steam valve 146 has the same configuration with that of the steam valve 121 except that the steam valve 146 has a valve main body 147 and a stop valve 148 instead of the valve main body 41 and the stop valve 45 configuring the steam valve 121.

The valve main body 147 has the same configuration except that the contact surface 58*d* configuring the valve main body 41 is excluded from the configuration elements thereof and the first opposition surface 58*b* is directly connected to the outer circumferential surface 58*c*.

The stop valve 148 has the same configuration except for excluding the plurality of inclination surfaces 75*b* from the configuration elements.

In the power generation system 145 according to the fourth embodiment, the detection mechanism 122 and the display apparatus 125 described in the third embodiment are provided such that the message "the stop valve is in the full open state" can be displayed on the display screen 125C when the stop valve 148 is full open.

Fifth Embodiment

Figure 20:
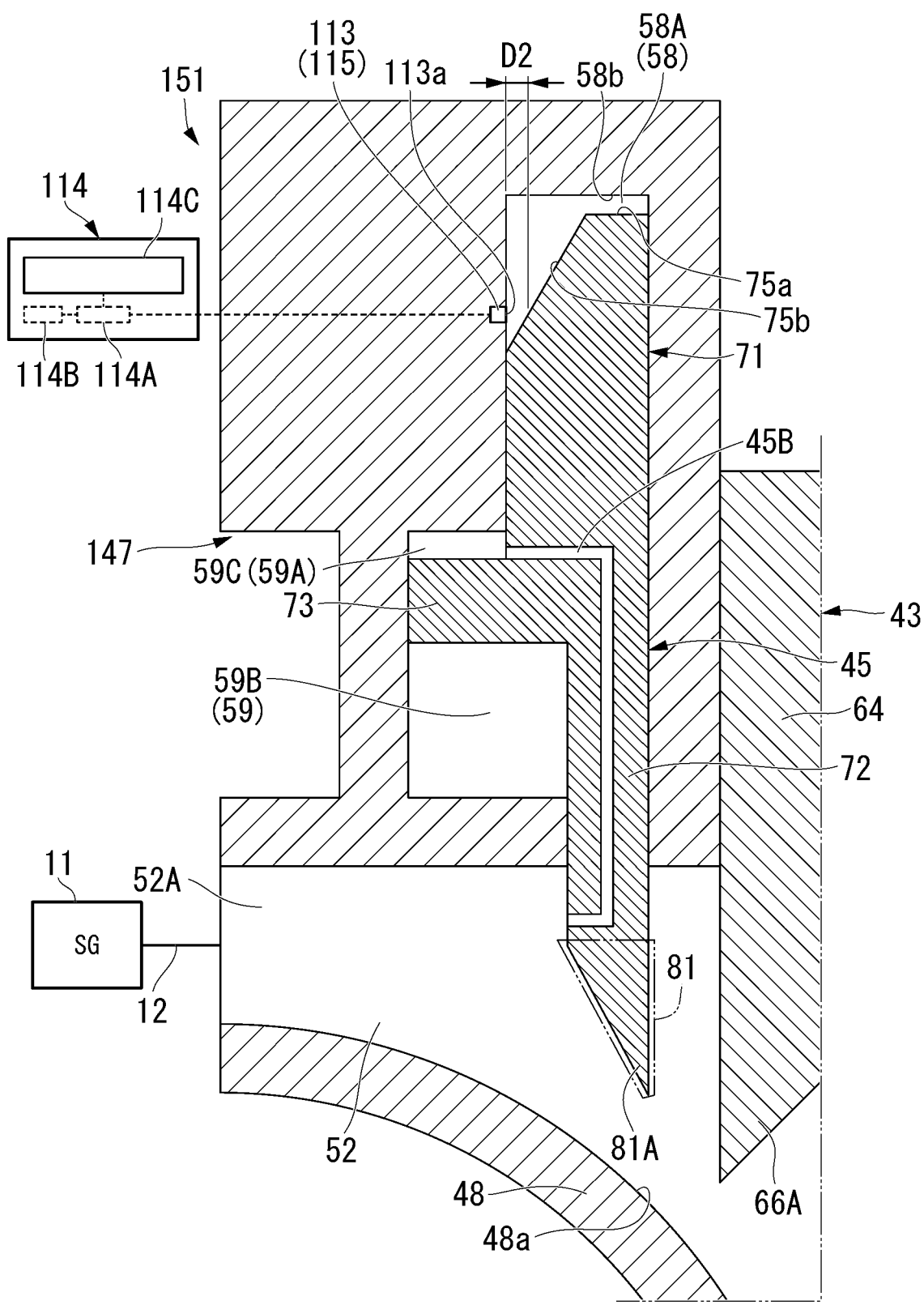
FIG. 20 is an enlarged sectional view showing a main part of a power generation system according to a fifth embodiment of the present invention and schematically showing a full open state of the stop valve and the regulation valve.

A power generation system 150 according to a fifth embodiment will be described by referring to FIG. 20. In FIG. 20, the same configurations with that of the structure described in FIGS. 15 and 19 will be assigned with the same reference signs.

The power generation system 150 has the same configuration with that of the power generation system 110 except that the power generation system 150 has a steam valve 151 instead of the steam valve 111 configuring the power generation system 110 according to the second embodiment and the position of the detection mechanism 113 configuring the power generation system 110 is different.

The steam valve 151 has the same configuration with the steam valve 111 except for having a valve main body 147 instead of the valve main body 41 configuring the steam valve 111.

The detection mechanism 113 is disposed in the valve main body 147 positioned outwardly with respect to the stop valve 45 in the diameter direction.

The detection surface 113*a* faces the inclination surface 75*b* outwardly with respect to the stop valve 45 in the diameter direction. The detection surface 113*a* is exposed from the outer circumferential surface 58*c*.

The sensor 115 as the detection mechanism 113 is configured to determine a distance D2 between the detection surface 113*a* and the inclination surface 75*b* and transmit data corresponding to the distance D2 to the display apparatus 114.

The data indicating the relationship between the distance D2 and the opening degree of the stop valve 45 is stored in the memory portion 114A of the display apparatus 114.

The opening-degree-calculation portion 114B is configured to calculate the opening degree of the stop valve 45 according to the distance D2 determined by the detection mechanism 113 and the data stored in the memory portion 114A.

The display screen 114C is configured to display the opening degree of the stop valve 45 (for example, characters of "opening degree is 50%" are shown in a situation in which the opening degree is 50%).

According to the power generation system 150 according to the fifth embodiment, the detection mechanism 113 and the display apparatus 114 are provided such that it is possible to display the opening degree of the stop valve 45 corresponding to the distance D2 determined by the detection mechanism 113 on the display screen 114C. Accordingly, the operator can recognize the opening degree of the stop valve 45.

Several preferred embodiments of the present invention have been described in detail above, and the present invention is not limited to specific embodiments. Various modifications and changes can be made without departing from the concept of the present invention described in the claims.

REFERENCE SIGNS LIST 1, 110, 120, 145, 150: power generation system
10: steam turbine
11: boiler
12: first steam supply piping
14, 85, 111, 121, 146, 151: stem valve
16: second steam supply piping
18: reheater
21: stop valve
22, 43: regulation valve
25: third steam supply piping
26: generator
31: high-pressure steam turbine
32: middle-pressure steam turbine
33: low-pressure steam turbine
35: rotation shaft
41, 147: valve main body
41A: penetration hole
45, 86, 90, 95, 100, 148: stop valve
45A: hollow portion
45B: flow passage
48: valve seat
51: valve accommodation member
51a, 58a, 64a, 71a: inner circumferential surface
51A: plate portion
52: steam flow passage
52A: inlet port
52B: outlet port
55: regulation-valve-accommodation space
56: stop-valve-accommodation space
57: penetration portion
58: first accommodation space
58A: low-pressure space
58B: first gap
58b: first opposition surface
58c, 59c, 64b, 71b, 72a, 73c: outer circumferential surface
58d: contact surface
59: second accommodation space
59a: second opposition surface
59A: high-pressure space
59b: bottom surface
59B: pressure space
59C: second gap
63: shaft portion
63A: one end
64: regulation valve main body
66, 81: tip end portion
66a, 75b, 81a, 93a, 97a, 102a: inclination surface
66A, 81A: tip end
71, 91, 96, 101: first part
72: second part
73: enlarged diameter portion
73a, 73b, 141a, 141b, 142a: surface
75, 93, 97, 102: base end portion
75a: base end surface
81: tip end portion
88: curved surface
113, 122: detection mechanism
113a: detection surface
114, 125: display apparatus
114A: memory portion
114B: opening-degree-calculation portion
114C, 125A: display screen
115: sensor
131: rod-shaped member
133: elastic-force-apply portion
135: detection portion
137: first rod-shaped part
137A, 137B, 138A, 138B: end
138: second rod-shaped part
141: first elastic-body-fixation portion
142: second elastic-body-fixation portion
143: elastic body
141a, 141b, 142a: surface
A, B: region
D1, D2: distance
θ1, θ2: inclination angle
O: axis

The invention claimed is:

1. A steam valve, comprising:
a tubular stop valve, the stop valve being configured to move toward an upper end side along a direction of an axis when the stop valve is opened and move toward a lower end side along the direction of the axis when the stop valve is closed; and
a valve main body configured to accommodate the stop valve,
wherein a base end portion including an end portion of the stop valve at the upper end side in the direction of the axis is accommodated in a first accommodation space formed in the valve main body,
wherein the base end portion has a plurality of inclination surfaces formed on an outer circumference of the base end portion, the plurality of inclination surfaces being inclined such that a distance from the axis to each of the plurality of inclination surfaces decreases toward the upper end side in the direction of the axis, and
wherein a plurality of contact surfaces are formed in the first accommodation space to come in contact with the plurality of inclination surfaces respectively when the stop valve moves toward the upper end side in the direction of the axis.

2. The steam valve according to claim 1, wherein an inclination angle of each of the plurality of inclination surfaces with respect to the axis is determined to be equal to or larger than 10 degrees and equal to or less than 60 degrees.

3. The steam valve according to claim 1,
wherein the stop valve has a first part including the based end portion, a second part including a tip end portion contacting with a valve seat of the valve main body, and an enlarged diameter portion, the enlarged diameter portion being disposed between the first part and the second part and the enlarged diameter portion having a ring shape and protruding outwardly in a radial direction from the outer circumferential surface of the first part and the second part, wherein the valve main body has a second accommodation space formed to accommodate the enlarged diameter portion such that the enlarged diameter portion can be moved upwardly and downwardly in the direction of the axis, and wherein in a state in which a movement of the valve main body toward the upper end side in the direction of the axis is finished, a first gap in the direction of the axis is formed between the base end portion and the valve main body, and a second gap in the direction of the axis is formed between the valve main body and a surface of the enlarged diameter portion disposed at the side of the first part.

4. The steam valve according to claim 1, wherein the steam valve further includes a detection surface, and a detection mechanism configured to detect a distance between the detection surface and the stop valve.

5. The steam valve according to claim 1, wherein the steam valve further includes a detection mechanism configured to detect an open/close state of the stop valve.

6. The steam valve according to claim 5,
wherein the detection mechanism has:
a rod-shaped member configured to penetrate a part of the valve main body facing a base end surface of the base end portion and have an end coming in contact with the base end surface of the base end portion,
an elastic-force-apply portion configured to apply an elastic force with respect to the rod-shaped member so as to maintain the state in which the end of the rod-shaped member comes in contact with the base end surface, and
a detection portion configured to face another end of the rod-shaped member in the direction of the axis and to detect a full open state of the stop valve by coming in contact with the other end of the rod-shaped member.

7. The steam valve according to claim 4,
wherein the detection mechanism has a sensor disposed in the valve main body so as to face the base end surface of the base end portion in the direction of the axis, and
wherein the sensor is configured to determine a distance between the sensor and the base end surface in the direction of the axis.

8. A power generation system, comprising:
the steam valve according to claim 1;
a boiler configured to generate steam;
a steam turbine driven by the steam; and
a steam supply piping configured to connect the boiler and the steam turbine to supply the steam to the steam turbine,
wherein the steam valve is provided in the steam supply piping.

9. A power generation system, comprising:
the steam valve according to claim 7;
a boiler configured to generate steam;
a steam turbine driven by the steam;
a steam supply piping configured to connect the boiler and the steam turbine to supply the steam to the steam turbine; and
a display apparatus configured to achieve the opening degree of the stop valve according to the distance between the sensor and the base end surface and display the opening degree of the stop valve on a display screen,
wherein the steam valve is provided in the steam supply piping.

10. The steam valve according to claim 1, further comprising:
a detection mechanism configured to detect an open/close state of the stop valve or detect a distance between a detection surface included in the detection mechanism and the stop valve.

11. The steam valve according to claim 10,
wherein a base end portion including an end portion of the stop valve at the upper end side in the direction of the axis is accommodated in a first accommodation space formed in the valve main body, and
wherein the base end portion has:
a rod-shaped member configured to penetrate a part of the valve main body facing a base end surface of the base end portion and have an end coming in contact with the base end surface of the base end portion;
an elastic-force-apply portion configured to apply an elastic force with respect to the rod-shaped member so as to maintain the state in which the end of the rod-shaped member comes in contact with the base end surface; and
a detection portion configured to face another end of the rod-shaped member in the direction of the axis and to detect a full open state of the stop valve by coming in contact with the other end of the rod-shaped member.

12. The steam valve according to claim 11,
wherein the base end portion has a plurality of inclination surfaces formed on an outer circumference of the base end portion, the plurality of inclination surfaces being inclined such that a distance from the axis to each of the plurality of inclination surfaces decreases toward the upper end side in the direction of the axis,
wherein an outer circumferential surface is formed in the first accommodation space to surround the plurality of inclination surfaces while facing the base end portion in a diameter direction of the base end portion, and
wherein the detection mechanism has a sensor configured to determine a distance between the outer circumferential surface and the plurality of inclination surfaces.

13. A power generation system, comprising:
the steam valve according to claim 10;
a boiler configured to generate steam;
a steam turbine driven by the steam; and
a steam supply piping configured to connect the boiler and the steam turbine to supply the steam to the steam turbine,
wherein the steam valve is provided in the steam supply piping.

14. A power generation system, comprising:
the steam valve according to claim 12;
a boiler configured to generate steam;
a steam turbine driven by the steam;
a steam supply piping configured to connect the boiler and the steam turbine to supply the steam to the steam turbine; and
a display apparatus configured to achieve the opening degree of the stop valve according to the distance between the sensor and the base end surface and display the opening degree of the stop valve on a display screen, wherein the steam valve is provided in the steam supply piping.

\* \* \* \* \*